(12) United States Patent
Van Duren et al.

(10) Patent No.: US 12,028,744 B2
(45) Date of Patent: Jul. 2, 2024

(54) USER EQUIPMENT MESSAGING TECHNIQUES AND APPLICATIONS

(71) Applicant: QUALCOMM Incorporated, San Diego, CA (US)

(72) Inventors: Drew Foster Van Duren, Templeton, CA (US); William Whyte, Belmont, MA (US); Sean Vincent Maschue, Encinitas, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 505 days.

(21) Appl. No.: 17/078,470

(22) Filed: Oct. 23, 2020

(65) Prior Publication Data

US 2021/0127292 A1     Apr. 29, 2021

Related U.S. Application Data

(60) Provisional application No. 62/925,538, filed on Oct. 24, 2019.

(51) Int. Cl.
*H04W 28/02*     (2009.01)
*H04W 4/44*      (2018.01)

(52) U.S. Cl.
CPC ......... *H04W 28/0289* (2013.01); *H04W 4/44* (2018.02); *H04W 28/0236* (2013.01); *H04W 28/0284* (2013.01)

(58) Field of Classification Search
None
See application file for complete search history.

(56) References Cited

U.S. PATENT DOCUMENTS

| | | | |
|---|---|---|---|
| 2016/0128066 A1 | 5/2016 | Park et al. | |
| 2017/0215119 A1 | 7/2017 | Hong et al. | |
| 2018/0262887 A1 | 9/2018 | Futaki | |
| 2018/0332585 A1* | 11/2018 | Faurie | H04W 76/14 |
| 2019/0274065 A1* | 9/2019 | Zhao | H04W 24/10 |

(Continued)

FOREIGN PATENT DOCUMENTS

| | | |
|---|---|---|
| CN | 109118775 A | 1/2019 |
| EP | 1042738 A1 | 10/2000 |

(Continued)

OTHER PUBLICATIONS

Partial International Search Report—PCT/US2020/057347—ISA/EPO—dated Dec. 18, 2020.

(Continued)

*Primary Examiner* — Mohammad S Adhami
(74) *Attorney, Agent, or Firm* — SUNSTEIN LLP/Qualcomm

(57) ABSTRACT

A method of controlling a radio-frequency (RF) transaction region comprises: determining a value of a characteristic associated with an ability of roadside equipment, associated with an RF transaction, to obtain information from a user equipment (UE) in the RF transaction region; determining, based on the value of the characteristic, a value of a parameter affecting the ability of the roadside equipment to obtain the information from the UE in the RF transaction region; and conveying the value of the parameter to the UE to affect transmission of messages from the UE to the roadside equipment.

48 Claims, 13 Drawing Sheets

(56) References Cited

U.S. PATENT DOCUMENTS

2020/0213921 A1* 7/2020 Song .................. H04W 36/32
2020/0245260 A1* 7/2020 Desai ................ H04W 52/245
2022/0046437 A1* 2/2022 Lee ................... H04W 76/14

FOREIGN PATENT DOCUMENTS

| WO | 2011144247 A1 | 11/2011 |
| WO | 2018031526 A1 | 2/2018 |
| WO | 2018084520 A1 | 5/2018 |

OTHER PUBLICATIONS

International Search Report and Written Opinion—PCT/US2020/057347—ISA/EPO—dated Feb. 15, 2021.

* cited by examiner

USER EQUIPMENT MESSAGING TECHNIQUES AND APPLICATIONS

CROSS-REFERENCE TO RELATED APPLICATIONS

This application claims the benefit of U.S. Provisional Application No. 62/925,538, filed Oct. 24, 2019, entitled "USER EQUIPMENT MESSAGE TECHNIQUES AND APPLICATIONS," assigned to the assignee hereof, and the entire contents of which are hereby incorporated herein by reference.

BACKGROUND

The connected-vehicle radio-frequency environment is a spectrum-limited, bandwidth-limited resource. For example, the available spectrum may be about 20 MHz a just under 6 GHz. This spectrum may be increasingly used as more radio-frequency-based connected-vehicle (e.g., vehicle to everything (V2X)) transactions occur. This spectrum, or one or more other spectrums, may have similar limitations and may be used for vehicle applications or other applications, e.g., pedestrian-to-everything (P2X) applications. Also, some radio protocols do not provide reliable unicast performance. Systems, such as vehicle tolling systems, relying on V2X transactions may miss vehicles that traverse a transaction enforcement region. For example, when a vehicle enters a transaction enforcement region and transmits a message to a roadside equipment (RSE) (also called a roadside unit (RSU)), the RSE may not receive or be able to process the message, and thus may miss a desired transaction (e.g., collection of a fee). A failed transaction may have one or more consequences such as lost revenue for the concessionaire and/or increased cost of enforcement to obtain a fee by other means such as visual inspection (possibly by a person) to identify the vehicle and further efforts to obtain payment from an account associated with the vehicle. Various factors may affect the ability to effect a transaction with a vehicle that passes through a transaction enforcement region. For example, topology of the transaction enforcement region, changing traffic conditions, vehicle speeds, and/or radio frequency (RF) bandwidth congestion from other (vehicle) transmissions may affect the ability of a system to obtain appropriate information for, if not complete, a transaction while a vehicle passes through the transaction enforcement region.

Vehicles may transmit multiple transaction-inducing messages to attempt to overcome poor unicast performance, but this may come at cost. The multiple messages may increase the probability of the RSE detecting and processing one of the messages. The multiple transmissions, however, especially with many other vehicles in the vicinity, with many or all of them making multiple transmissions, may adversely affect the local radio environment (e.g., increased channel congestion and/or interference) and degrade the ability to receive the transaction-inducing messages and/or other types of messages such as vehicle safety messages.

SUMMARY

An example method of controlling a radio-frequency (RF) transaction region includes: determining a value of a characteristic associated with an ability of roadside equipment, associated with an RF transaction, to obtain information from a user equipment (UE) in the RF transaction region; determining, based on the value of the characteristic, a value of a parameter affecting the ability of the roadside equipment to obtain the information from the UE in the RF transaction region; and conveying the value of the parameter to the UE to affect transmission of messages from the UE to the roadside equipment.

Implementations of such a method may include one or more of the following features. The characteristic is at least one of a measured RF environment of the RF transaction region, a measured transaction loss rate of the RF transaction region, a congestion schedule of the RF transaction region, a predicted loss rate of the RF transaction region, or a predicted RF environment of the RF transaction region. The parameter includes: (a) a perimeter of the RF transaction region; or (b) a minimum number of transaction messages to be sent by the UE while in the RF transaction region; or (c) a maximum number of the transaction messages to be sent by the UE while in the RF transaction region; or (d) a rate of the transaction messages to be sent by the UE while in the RF transaction region; or (e) a transmission power to be used by the UE to transmit the transaction messages while in the RF transaction region; or (f) a combination of two or more of (a)-(e). The parameter includes the rate of the transaction messages to be sent by the UE while in the RF transaction region, and the rate of the transaction messages to be sent by the UE while in the RF transaction region is a function of speed of the UE while in the RF transaction region. The parameter includes the rate of the transaction messages to be sent by the UE while in the RF transaction region, and the rate of the transaction messages to be sent by the UE while in the RF transaction region is a portion of position messages in which the UE is to include the transaction messages. Conveying the value of the parameter to the UE includes conveying the value of the parameter to the UE from the roadside equipment or from a back-end device.

An example apparatus configured to affect a radio-frequency (RF) transaction region includes: a transmitter; and a processor communicatively coupled to the transmitter and configured to: determine a value of a characteristic associated with an ability of roadside equipment associated with an RF transaction to obtain information from a user equipment (UE) in the RF transaction region; determine, based on the value of the characteristic, a value of a parameter affecting the ability of the roadside equipment to obtain the information from the UE in the RF transaction region; and send the value of the parameter to the UE to affect transmission of messages from the UE to the roadside equipment.

Implementations of such an apparatus may include one or more of the following features. The characteristic is at least one of a measured RF environment of the RF transaction region, a measured transaction loss rate of the RF transaction region, a congestion schedule of the RF transaction region, a predicted loss rate of the RF transaction region, or a predicted RF environment of the RF transaction region. The parameter includes: (a) a perimeter of the RF transaction region; or (b) a minimum number of transaction messages to be sent by the UE while in the RF transaction region; or (c) a maximum number of the transaction messages to be sent by the UE while in the RF transaction region; or (d) a rate of the transaction messages to be sent by the UE while in the RF transaction region; or (e) a transmission power to be used by the UE to transmit the transaction messages while in the RF transaction region; or (f) a combination of two or more of (a)-(e). The includes the rate of the transaction messages to be sent by the UE while in the RF transaction region, and the rate of the transaction messages to be sent by the UE while in the RF transaction region is a function of speed of the UE while in the RF transaction region. The parameter includes the rate of the transaction messages to be sent by the UE while in the RF transaction region, and the rate of the transaction messages to be sent by the UE while in the RF transaction region is a portion of position messages in which the UE is to include the transaction messages. The processor is configured to cause the transmitter to send the value of the parameter to the UE wirelessly.

Another example apparatus configured to affect a radio-frequency (RF) transaction region includes: means for determining a value of a characteristic associated with an ability of roadside equipment associated with an RF transaction to obtain information from a user equipment (UE) in the RF transaction region; means for determining, based on the value of the characteristic, a value of a parameter affecting the ability of the roadside equipment to obtain the information from the UE in the RF transaction region; and means for conveying the value of the parameter to the UE to affect transmission of messages from the UE to the roadside equipment.

Implementations of such an apparatus may include one or more of the following features. The characteristic is at least one of a measured RF environment of the RF transaction region, a measured transaction loss rate of the RF transaction region, a congestion schedule of the RF transaction region, a predicted loss rate of the RF transaction region, or a predicted RF environment of the RF transaction region. The parameter includes: (a) a perimeter of the RF transaction region; or (b) a minimum number of transaction messages to be sent by the UE while in the RF transaction region; or (c) a maximum number of the transaction messages to be sent by the UE while in the RF transaction region; or (d) a rate of the transaction messages to be sent by the UE while in the RF transaction region; or (e) a transmission power to be used by the UE to transmit the transaction messages while in the RF transaction region; or (f) a combination of two or more of (a)-(e). The parameter includes the rate of the transaction messages to be sent by the UE while in the RF transaction region, and the rate of the transaction messages to be sent by the UE while in the RF transaction region is a function of speed of the UE while in the RF transaction region. The parameter includes the rate of the transaction messages to be sent by the UE while in the RF transaction region, and the rate of the transaction messages to be sent by the UE while in the RF transaction region is a portion of position messages in which the UE is to include the transaction messages. The means for conveying are for conveying the value of the parameter to the UE includes conveying the value of the parameter to the UE wirelessly.

An example non-transitory, processor-readable storage medium includes processor-readable instructions configured to cause a processor to: determine a value of a characteristic associated with an ability of roadside equipment associated with a radio-frequency (RF) transaction to obtain information from a user equipment (UE) in an RF transaction region; determine, based on the value of the characteristic, a value of a parameter affecting the ability of the roadside equipment to obtain the information from the UE in the RF transaction region; and send the value of the parameter to the UE to affect transmission of messages from the UE to the roadside equipment.

Implementations of such a storage medium may include one or more of the following features. The characteristic is at least one of a measured RF environment of the RF transaction region, a measured transaction loss rate of the RF transaction region, a congestion schedule of the RF transaction region, a predicted loss rate of the RF transaction region, or a predicted RF environment of the RF transaction region. The parameter includes: (a) a perimeter of the RF transaction region; or (b) a minimum number of transaction messages to be sent by the UE while in the RF transaction region; or (c) a maximum number of the transaction messages to be sent by the UE while in the RF transaction region; or (d) a rate of the transaction messages to be sent by the UE while in the RF transaction region; or (e) a transmission power to be used by the UE to transmit the transaction messages while in the RF transaction region; or (f) a combination of two or more of (a)-(e). The parameter includes the rate of the transaction messages to be sent by the UE while in the RF transaction region, and the rate of the transaction messages to be sent by the UE while in the RF transaction region is a function of speed of the UE while in the RF transaction region. The parameter includes the rate of the transaction messages to be sent by the UE while in the RF transaction region, and the rate of the transaction messages to be sent by the UE while in the RF transaction region is a portion of position messages in which the UE is to include the transaction messages. The processor is configured to cause a transceiver of the roadside equipment to send the value of the parameter to the UE wirelessly.

An example method of conveying one or more transaction messages associated with a radio-frequency (RF) transaction region includes: obtaining, at a user equipment (UE), a value of a parameter affecting an ability of roadside equipment to obtain information from the UE in the RF transaction region; and conveying the one or more transaction messages from the UE to the roadside equipment in accordance with the value of the parameter.

Implementations of such a method may include one or more of the following features. The UE obtains the value of the parameter before entering the RF transaction region. Conveying the one or more transaction messages includes: (a) conveying the one or more transaction messages from the UE only while the UE is within a perimeter of the RF transaction region indicated by the value of the parameter; or (b) conveying at least a minimum number of the one or more transaction messages, indicated by the value of the parameter, while the UE is in the RF transaction region; or (c) conveying no more than a maximum number of the one or more transaction messages, indicated by the value of the parameter, while the UE is in the RF transaction region; or (d) conveying the one or more transaction messages at a rate, indicated by the value of the parameter, while the UE is in the RF transaction region; or (e) conveying the one or more transaction messages at a transmission power, indicated by the value of the parameter, while the UE is in the RF transaction region; or (f) a combination of two or more of (a)-(e). Conveying the one or more transaction messages includes conveying the one or more transaction messages at the rate indicated by the value of the parameter, and the rate is a function of speed of the UE while in the RF transaction region. Conveying the one or more transaction messages includes conveying the one or more transaction messages at the rate indicated by the value of the parameter, and the rate is a portion of position messages sent by the UE in which the UE is to include the transaction messages. The method includes: receiving, at the UE, identifying information from another UE; and producing at least one of the one or more transaction messages as a composite transaction message including identifying information of the UE and the identifying information from the other UE.

An example user equipment (UE) for conveying one or more transaction messages associated with a radio-frequency (RF) transaction region includes: a transmitter; and a processor communicatively coupled to the transmitter and configured to: obtain a value of a parameter affecting an ability of roadside equipment to obtain information from the UE in the RF transaction region; and convey the one or more transaction messages via the transmitter to the roadside equipment in accordance with the value of the parameter.

Implementations of such a UE may include one or more of the following features. The processor is configured to obtain the value of the parameter before entering the RF transaction region. To convey the one or more transaction messages the processor is configured to determine whether the UE is in the RF transaction region and to: (a) convey the one or more transaction messages only while the UE is within a perimeter of the RF transaction region indicated by the value of the parameter; or (b) convey at least a minimum number of the one or more transaction messages, indicated by the value of the parameter, while the UE is in the RF transaction region; or (c) convey no more than a maximum number of the one or more transaction messages, indicated by the value of the parameter, while the UE is in the RF transaction region; or (d) convey the one or more transaction messages at a rate, indicated by the value of the parameter, while the UE is in the RF transaction region; or (e) convey the one or more transaction messages at a transmission power, indicated by the value of the parameter, while the UE is in the RF transaction region; or (f) a combination of two or more of (a)-(e). The processor is configured to determine a speed of the UE and to convey the one or more transaction messages as a function of the speed of the UE in accordance with the rate indicated by the value of the parameter. To convey the one or more transaction messages the processor is configured to convey the one or more transaction messages in fewer than all position messages to be sent by the UE in accordance with the rate indicated by the value of the parameter. The UE includes a receiver communicatively coupled to the processor, and the processor is configured to: receive, via the receiver, identifying information from another UE; and produce at least one of the one or more transaction messages as a composite transaction message including identifying information of the UE and the identifying information from the other UE.

Another example UE for conveying one or more transaction messages associated with a radio-frequency (RF) transaction region includes: means for obtaining a value of a parameter affecting an ability of roadside equipment to obtain information from the UE in the RF transaction region; and means for conveying the one or more transaction messages from the UE to the roadside equipment in accordance with the value of the parameter.

Implementations of such a UE may include one or more of the following features. The means for obtaining are for obtaining the value of the parameter before the UE enters the RF transaction region. The UE includes means for determining whether the UE is in the RF transaction region, and the means for conveying the one or more transaction messages include means for: (a) conveying the one or more transaction messages from the UE only while the UE is within a perimeter of the RF transaction region indicated by the value of the parameter; or (b) conveying at least a minimum number of the one or more transaction messages, indicated by the value of the parameter, while the UE is in the RF transaction region; or (c) conveying no more than a maximum number of the one or more transaction messages, indicated by the value of the parameter, while the UE is in the RF transaction region; or (d) conveying the one or more transaction messages at a rate, indicated by the value of the parameter, while the UE is in the RF transaction region; or (e) conveying the one or more transaction messages at a transmission power, indicated by the value of the parameter, while the UE is in the RF transaction region; or (f) a combination of two or more of (a)-(e). The UE includes means for determining a speed of the UE, and the means for conveying the one or more transaction messages are for conveying the one or more transaction messages as a function of the speed of the UE in accordance with the rate indicated by the value of the parameter. The means for conveying the one or more transaction messages are for conveying the one or more transaction messages in fewer than all position messages to be sent by the UE in accordance with the rate indicated by the value of the parameter. The UE includes: means for receiving identifying information from another UE; and means for producing at least one of the one or more transaction messages as a composite transaction message including identifying information of the UE and the identifying information from the other UE.

An example non-transitory, processor-readable storage medium includes processor-readable instructions configured to cause a processor of a user equipment (UE), in order to convey one or more transaction messages, to: obtain a value of a parameter affecting an ability of roadside equipment to obtain information from the UE in a radio-frequency (RF) transaction region; and convey the one or more transaction messages via a transmitter of the UE to the roadside equipment in accordance with the value of the parameter.

Implementations of such a storage medium may include one or more of the following features. The instructions configured to cause the processor to obtain the value of the parameter are configured to cause the processor to obtain the value of the parameter before the UE enters the RF transaction region. The storage medium includes instructions configured to cause the processor to determine whether the UE is in the RF transaction region, and the instructions configured to cause the processor to convey the one or more transaction messages are configured to cause the processor to: (a) convey the one or more transaction messages only while the UE is within a perimeter of the RF transaction region indicated by the value of the parameter; or (b) convey at least a minimum number of the one or more transaction messages, indicated by the value of the parameter, while the UE is in the RF transaction region; or (c) convey no more than a maximum number of the one or more transaction messages, indicated by the value of the parameter, while the UE is in the RF transaction region; or (d) convey the one or more transaction messages at a rate, indicated by the value of the parameter, while the UE is in the RF transaction region; or (e) convey the one or more transaction messages at a transmission power, indicated by the value of the parameter, while the UE is in the RF transaction region; or (f) a combination of two or more of (a)-(e). The storage medium includes instructions configured to cause the processor to determine a speed of the UE, and the instructions configured to cause the processor to convey the one or more transaction messages are configured to cause the processor to convey the one or more transaction messages as a function of the speed of the UE in accordance with the rate indicated by the value of the parameter. The instructions configured to cause the processor to convey the one or more transaction messages are configured to cause the processor to convey the one or more transaction messages in fewer than all position messages to be sent by the UE in accordance with the rate indicated by the value of the parameter. The storage medium includes instructions configured to cause the processor to: receive identifying information from another UE; and produce at least one of the one or more transaction messages as a composite transaction message including identifying information of the UE and the identifying information from the other UE.

An example method of completing a transaction for a UE includes: receiving, at roadside equipment, a position message indicating a position of the UE; receiving, at the roadside equipment, a transaction message from the UE, the transaction message being separate from the position message and including an encrypted token containing information associated with the UE to enable completion of the transaction; determining that the position message and the transaction message are cryptographically bound; decrypting the encrypted token to produce a decrypted token; determining a presence of the UE in a transaction region; and completing the transaction using the information contained in the decrypted token in response to determining that the position message and the transaction message are cryptographically bound and determining the presence of the UE in the transaction region.

Implementations of such a method may include one or more of the following features. Determining that the position message and the transaction message are cryptographically bound includes determining that the position message and the transaction message are both signed with the same digital certificate. Decrypting the encrypted token occurs before determining that the position message and the transaction message are cryptographically bound. The transaction message is part of another position message, and determining that the position message and the transaction message are cryptographically bound occurs before decrypting the encrypted token. Decrypting the encrypted token includes decrypting the encrypted token with a private key associated with the roadside equipment.

An example apparatus for completing a transaction for a UE includes: a receiver; and a processor communicatively coupled to the receiver and configured to: receive, via the receiver, a position message indicating a position of the UE; receive, via the receiver, a transaction message from the UE, the transaction message being separate from the position message and including an encrypted token containing information associated with the UE to enable completion of the transaction; determine that the position message and the transaction message are cryptographically bound; decrypt the encrypted token to produce a decrypted token; determine a presence of the UE in a transaction region; and complete the transaction using the information contained in the decrypted token in response to determining that the position message and the transaction message are cryptographically bound and determining the presence of the UE in the transaction region.

Implementations of such an apparatus may include one or more of the following features. To determine that the position message and the transaction message are cryptographically bound the processor is configured to determine that the position message and the transaction message are both signed with the same digital certificate. The processor is configured to decrypt the encrypted token before determining that the position message and the transaction message are cryptographically bound. The transaction message is part of another position message, and the processor is configured to determine that the position message and the transaction message are cryptographically bound occurs before decrypting the encrypted token. The processor is configured to decrypt the encrypted token with a private key associated with roadside equipment.

Another example apparatus for completing a transaction for a UE includes: means for receiving a position message indicating a position of the UE; means for receiving a transaction message from the UE, the transaction message being separate from the position message and including an encrypted token containing information associated with the UE to enable completion of the transaction; means for determining that the position message and the transaction message are cryptographically bound; means for decrypting the encrypted token to produce a decrypted token; means for determining a presence of the UE in a transaction region; and means for completing the transaction using the information contained in the decrypted token in response to determining that the position message and the transaction message are cryptographically bound and determining the presence of the UE in the transaction region.

Implementations of such an apparatus may include one or more of the following features. The means for determining that the position message and the transaction message are cryptographically bound include means for determining that the position message and the transaction message are both signed with the same digital certificate. The means for decrypting the encrypted token are for decrypting the encrypted token before determining that the position message and the transaction message are cryptographically bound. The transaction message is part of another position message, and the means for determining that the position message and the transaction message are cryptographically bound are for determining that the position message and the transaction message are cryptographically bound before the means for decrypting the encrypted token decrypt the encrypted token. The means for decrypting the encrypted token include means for decrypting the encrypted token with a private key associated with the roadside equipment.

An example non-transitory, processor-readable storage medium includes processor-readable instructions configured to cause a processor, in order to complete a transaction, to: receive a position message indicating a position of a user equipment (UE); receive a transaction message from the UE, the transaction message being separate from the position message and including an encrypted token containing information associated with the UE to enable completion of the transaction; determine that the position message and the transaction message are cryptographically bound; decrypt the encrypted token to produce a decrypted token; determine a presence of the UE in a transaction region; and complete the transaction using the information contained in the decrypted token in response to determining that the position message and the transaction message are cryptographically bound and determining the presence of the UE in the transaction region.

Implementations of such a storage medium may include one or more of the following features. The instructions configured to cause the processor to determine that the position message and the transaction message are cryptographically bound are configured to cause the processor to determine that the position message and the transaction message are both signed with the same digital certificate. The instructions configured to cause the processor to decrypt the encrypted token are configured to cause the processor to decrypt the encrypted token before determining that the position message and the transaction message are cryptographically bound. The transaction message is part of another position message, and the instructions configured to cause the processor to determine that the position message and the transaction message are cryptographically bound are configured to cause the processor to determine that the position message and the transaction message are cryptographically bound before decrypting the encrypted token.

The instructions configured to cause the processor to decrypt the encrypted token are configured to cause the processor to decrypt the encrypted token with a private key associated with roadside equipment.

An example method of providing a transaction message from a UE to roadside equipment includes: sending a position message from the UE to the roadside equipment, the position message indicating a position of the UE; encrypting a token containing information associated with the UE to produce an encrypted token and enable completion of a transaction; cryptographically binding the token with the position message; and sending the transaction message from the UE to the roadside equipment, the transaction message including the encrypted token and being separate from the position message.

Implementations of such a method may include one or more of the following features. Cryptographically binding the token with the position message includes digitally signing the token and the position message with the same digital certificate. Digitally signing the token occurs before encrypting the token, and encrypting the token includes encrypting the digital certificate. The transaction message is part of another position message, and digitally signing the token occurs after encrypting the token and includes digitally signing the transaction message. Encrypting the token includes encrypting the token with a public key associated with the roadside equipment.

An example UE includes: a transmitter; and a processor communicatively coupled to the transmitter and configured to: send a position message from the UE to roadside equipment, the position message indicating a position of the UE; encrypt a token containing information associated with the UE to produce an encrypted token and enable completion of a transaction; cryptographically bind the token with the position message; and send a transaction message from the UE to the roadside equipment, the transaction message including the encrypted token and being separate from the position message.

Implementations of such a UE may include one or more of the following features. To cryptographically bind the token with the position message the processor is configured to digitally sign the token and the position message with the same digital certificate. The processor is configured to digitally sign the token before encrypting the token, and the processor is configured to encrypt the digital certificate along with the token. The transaction message is part of another position message, and the processor is configured to digitally sign the transaction message, including the token, after encrypting the token. The processor is configured to encrypt the token by encrypting the token with a public key associated with the roadside equipment.

Another example UE includes: means for sending a position message from the UE to roadside equipment, the position message indicating a position of the UE; means for encrypting a token containing information associated with the UE to produce an encrypted token and enable completion of a transaction; means for cryptographically binding the token with the position message; and means for sending a transaction message from the UE to the roadside equipment, the transaction message including the encrypted token and being separate from the position message.

Implementations of such a UE may include one or more of the following features. The means for cryptographically binding the token with the position message include means for digitally signing the token and the position message with the same digital certificate. The means for digitally signing the token are for digitally signing the token before encrypting the token, and the means for encrypting the token are for encrypting the digital certificate along with the token. The transaction message is part of another position message, and the means for digitally signing the token are for digitally signing the transaction message, including the token, after encrypting the token. The means for encrypting the token include means for encrypting the token with a public key associated with the roadside equipment.

An example non-transitory, processor-readable storage medium includes processor-readable instructions configured to cause a processor of a UE to: send a position message from the UE to roadside equipment, the position message indicating a position of the UE; encrypt a token containing information associated with the UE to produce an encrypted token and enable completion of a transaction; cryptographically bind the token with the position message; and send a transaction message from the UE to the roadside equipment, the transaction message including the encrypted token and being separate from the position message.

Implementations of such a storage medium may include one or more of the following features. To cryptographically bind the token with the position message the instructions are configured to cause the processor to digitally sign the token and the position message with the same digital certificate. The instructions are configured to cause the processor to digitally sign the token before encrypting the token, and to encrypt the digital certificate along with the token. The transaction message is part of another position message, and the instructions are configured to cause the processor to digitally sign the transaction message, including the token, after encrypting the token. The instructions are configured to cause the processor to encrypt the token by encrypting the token with a public key associated with the roadside equipment.

An example method of verifying a presence of a first UE in a transaction region includes: receiving a first message from the first UE, the first message being associated with the transaction region, the first message including first information indicative of a first neighbor UE within communication range of the first UE; receiving a second message from a second UE, the second message including second information indicative of a second neighbor UE within communication range of the second UE; analyzing the first message and the second message to determine whether the first information corresponds to the second UE and the second information corresponds to the first UE; and verifying the presence of the first UE in the transaction region in response to determining that the first information corresponds to the second UE and the second information corresponds to the first UE.

Implementations of such a method may include one or more of the following features. The method includes sending a collection message to the first UE indicating what information to report as the first information. The collection message indicates to report ephemeral, non-repeating information as the first information.

Another example apparatus includes: a receiver; and a processor communicatively coupled to the receiver and configured to: receive, via the receiver, a first message from a first user equipment (UE), the first message being associated with a transaction region, the first message including first information indicative of a first neighbor UE within communication range of the first UE; receive, via the receiver, a second message from a second UE, the second message including second information indicative of a second neighbor UE within communication range of the second UE; analyze the first message and the second message to determine whether the first information corresponds to the second UE and the second information corresponds to the first UE; and verify a presence of the first UE in the transaction region in response to determining that the first information corresponds to the second UE and the second information corresponds to the first UE.

Implementations of such an apparatus may include one or more of the following features. The apparatus includes a transmitter communicatively coupled to the processor, and the processor is configured to send, via the transmitter, a collection message to the first UE indicating what information to report as the first information. The collection message indicates to report ephemeral, non-repeating information as the first information.

Another example apparatus includes: means for receiving a first message from a first user equipment (UE), the first message being associated with a transaction region, the first message including first information indicative of a first neighbor UE within communication range of the first UE; means for receiving a second message from a second UE, the second message including second information indicative of a second neighbor UE within communication range of the second UE; means for analyzing the first message and the second message to determine whether the first information corresponds to the second UE and the second information corresponds to the first UE; and means for verifying a presence of the first UE in the transaction region in response to determining that the first information corresponds to the second UE and the second information corresponds to the first UE.

Implementations of such an apparatus may include one or more of the following features. The apparatus includes means for sending a collection message to the first UE indicating what information to report as the first information. The collection message indicates to report ephemeral, non-repeating information as the first information.

Another example non-transitory, processor-readable storage medium includes processor-readable instructions configured to cause a processor to: receive a first message from a first user equipment (UE), the first message being associated with a transaction region, the first message including first information indicative of a first neighbor UE within communication range of the first UE; receive a second message from a second UE, the second message including second information indicative of a second neighbor UE within communication range of the second UE; analyze the first message and the second message to determine whether the first information corresponds to the second UE and the second information corresponds to the first UE; and verify a presence of the first UE in the transaction region in response to determining that the first information corresponds to the second UE and the second information corresponds to the first UE.

Implementations of such a storage medium may include one or more of the following features. The storage medium includes instructions configured to cause the processor to send a collection message to the first UE indicating what information to report as the first information. The collection message indicates to report ephemeral, non-repeating information as the first information.

DETAILED DESCRIPTION

Figure 1:
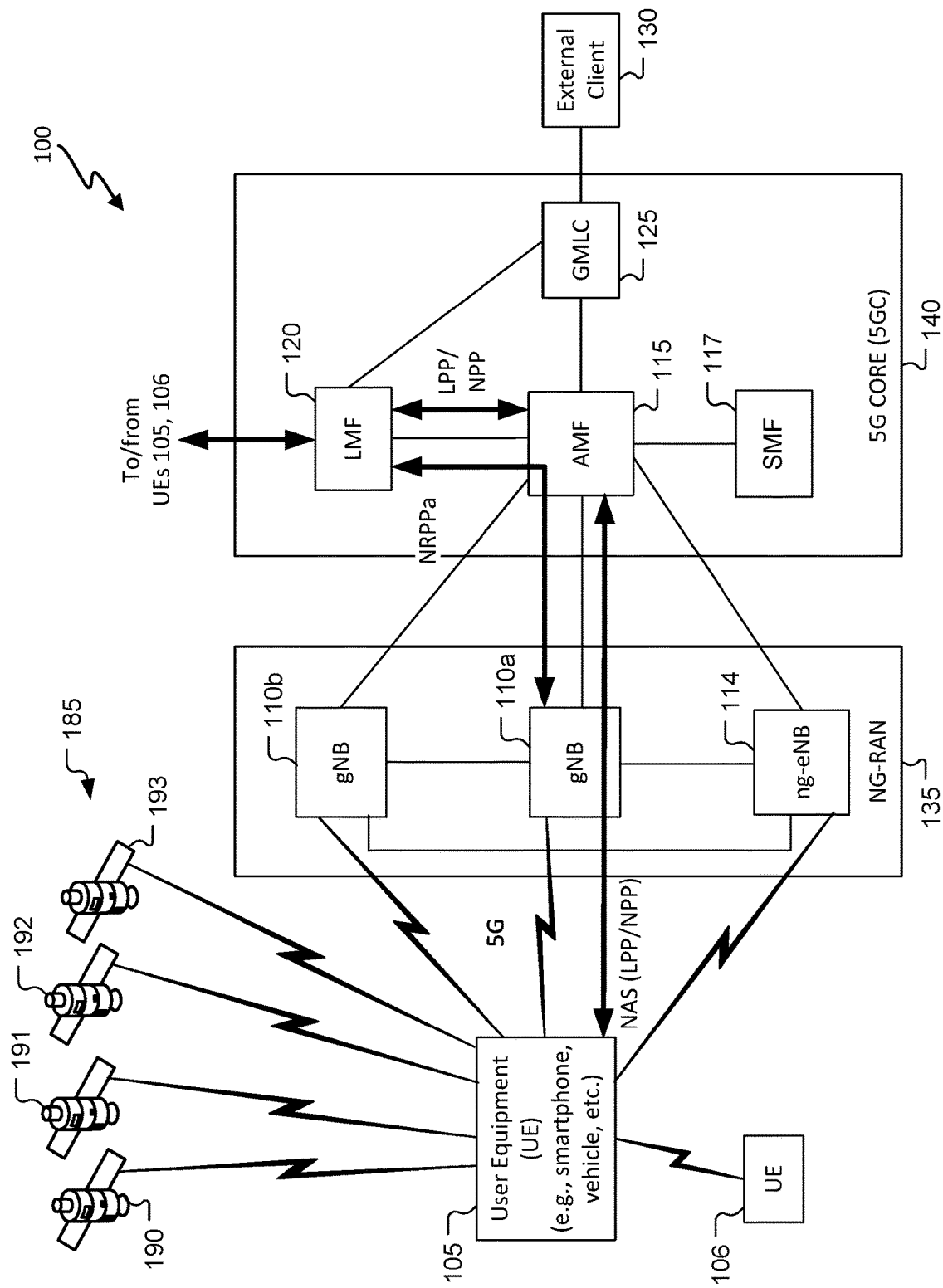
FIG. 1 is a schematic diagram of a connected-vehicle transaction system.

Techniques are discussed herein for providing adaptive transaction zone environments. For example, a closed-loop transaction system may adjust parameters affecting transaction performance (e.g., receipt of wireless transaction requests and processing thereof). The parameters may be adjusted to improve transaction performance while considering adverse impact(s) of the parameter adjustments on other signaling. For example, information may be provided to a user equipment regarding parameters for a radio-frequency transaction region. The parameters may affect characteristics such as: region size (and location) and shape; rate of, power of, minimum number of, and/or maximum number of transaction requests sent by user equipment in the region. The parameters may be changed over time and may be provided to the user equipment by a base station whose communication range includes the transaction region. At least portions of transaction messages explicitly and/or implicitly requesting a transaction may be encrypted. Transaction messages sent by user equipment may be digitally signed using the same digital certificate used to sign position messages sent by the user equipment in order to bind transaction messages with position messages. Also or alternatively, user equipment location may be confirmed or denied by determining whether the user equipment reports one or more neighbors that also report the user equipment as a neighbor. For example, it may be determined whether neighbor information contained in transaction messages from the user equipment identifies a neighbor who reports the user equipment in a neighbor list (e.g., in neighbor information of a transaction message). Other configurations, however, may be used.

Items and/or techniques described herein may provide one or more of the following capabilities, as well as other capabilities not mentioned. Transaction success rate may be improved. Transaction success rate may be improved without significantly reducing successful transfer of other signals, e.g., position messages, using similar frequency spectrum. User equipment location may be confirmed in a reliable way that is difficult to fake, e.g., by cross-referencing neighbor information of multiple devices. Extra verification may be provided that a user equipment has entered into a transaction without degrading privacy for the user equipment, e.g., using vehicle-to-everything position-signing certificates and usage patterns. Other capabilities may be provided and not every implementation according to the disclosure must provide any, let alone all, of the capabilities discussed. It may be possible for an effect noted above to be achieved by means other than that noted, and a noted item/technique may not necessarily yield the noted effect.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-U IRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the position of the UE.

One or more base stations (such as the gNBs 110a, 110b, the ng-eNB 114, etc.) may be part of a roadside equipment (RSE). The RSE may include one or more other features in addition to a base station, e.g., one or more cameras and/or one or more other sensors (e.g., one or more weight sensors, one or more radio-frequency sensors, etc.). The RSE may be integrated into an object such as a lamppost. The RSE may be called a roadside unit (RSU) or another name. The RSE may or may not be disposed in a vicinity (e.g., within wireless communication) of a road and thus the term "roadside" does not limit a location of the RSE.

Figure 2:
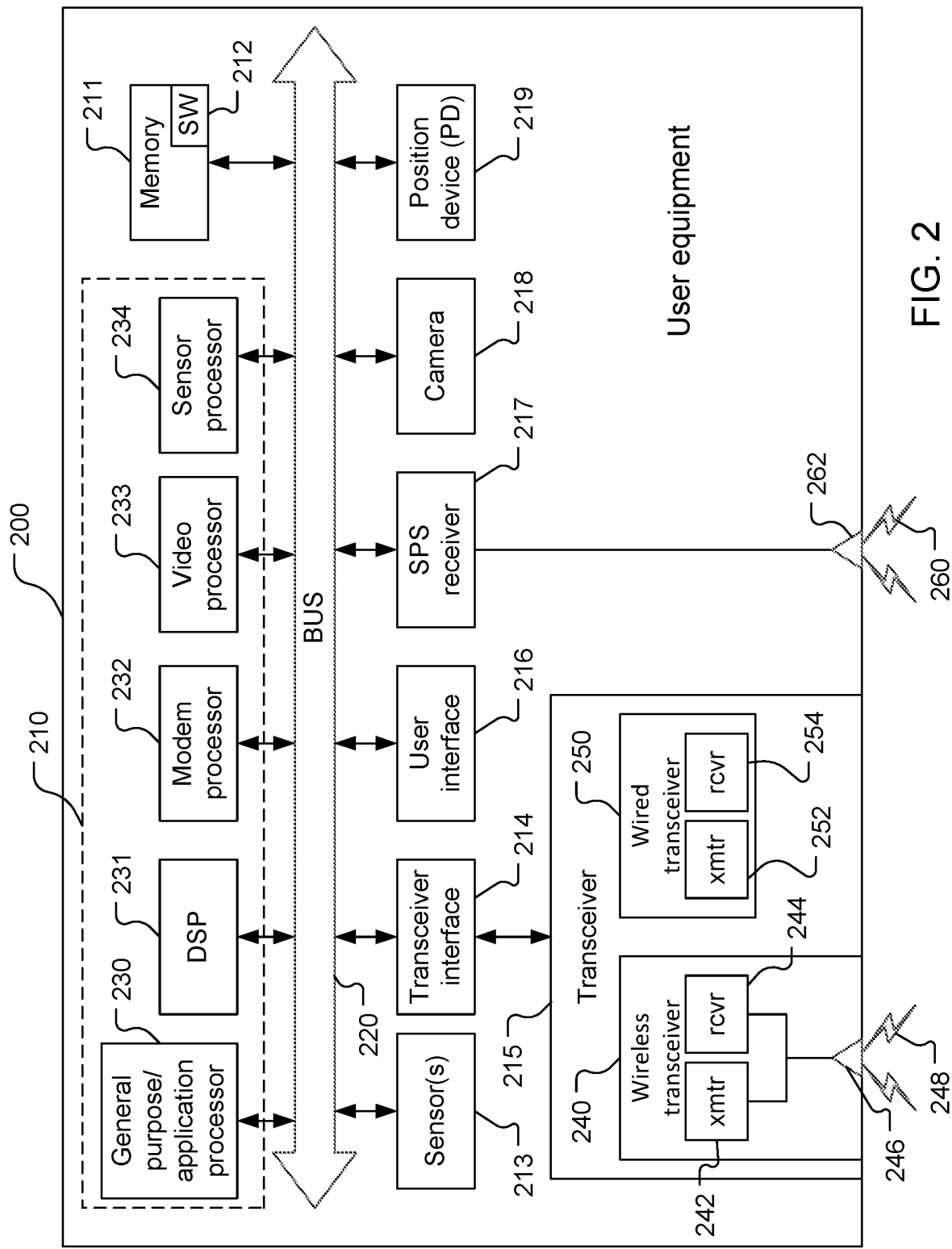
FIG. 2 is a block diagram of components of an example of a user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3A:
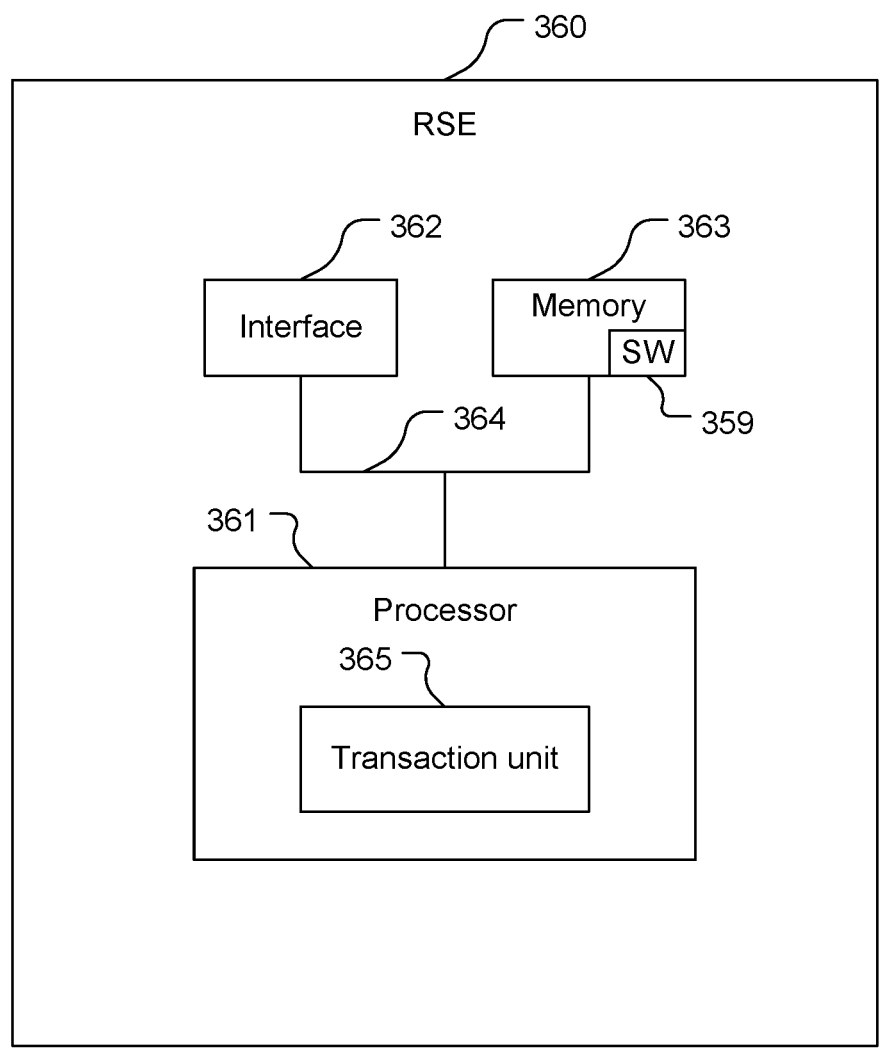
FIG. 3A is a block diagram of an example of roadside equipment.

Referring to FIG. 3A, with further reference to FIGS. 1-2, an RSE 360 includes a processor 361, an interface 362, and a memory 363 (including software 359) communicatively coupled to each other by a bus 364. The RSE 360 may include some or all of the components shown in FIG. 3A, and may include one or more other components such as any of those shown in FIG. 2. The description herein may refer only to the processor 361 performing a function, but this includes other implementations such as where the processor 361 executes software (stored in the memory 363) and/or firmware. The description herein may refer to the RSE 360 performing a function as shorthand for one or more appropriate components (e.g., the processor 361 and the memory 363) of the RSE 360 performing the function. The processor 361 (possibly in conjunction with the memory 363 and, as appropriate, the interface 362) may include a transaction unit 365. The transaction unit 365 may be configured to exchange one or more messages with one or more other devices, e.g., one or more UEs, perform a transaction (e.g., an instance of exchanging information, e.g., to buy and/or sell something). The configuration and functionality of the transaction unit 365 is discussed further herein.

Figure 3B:
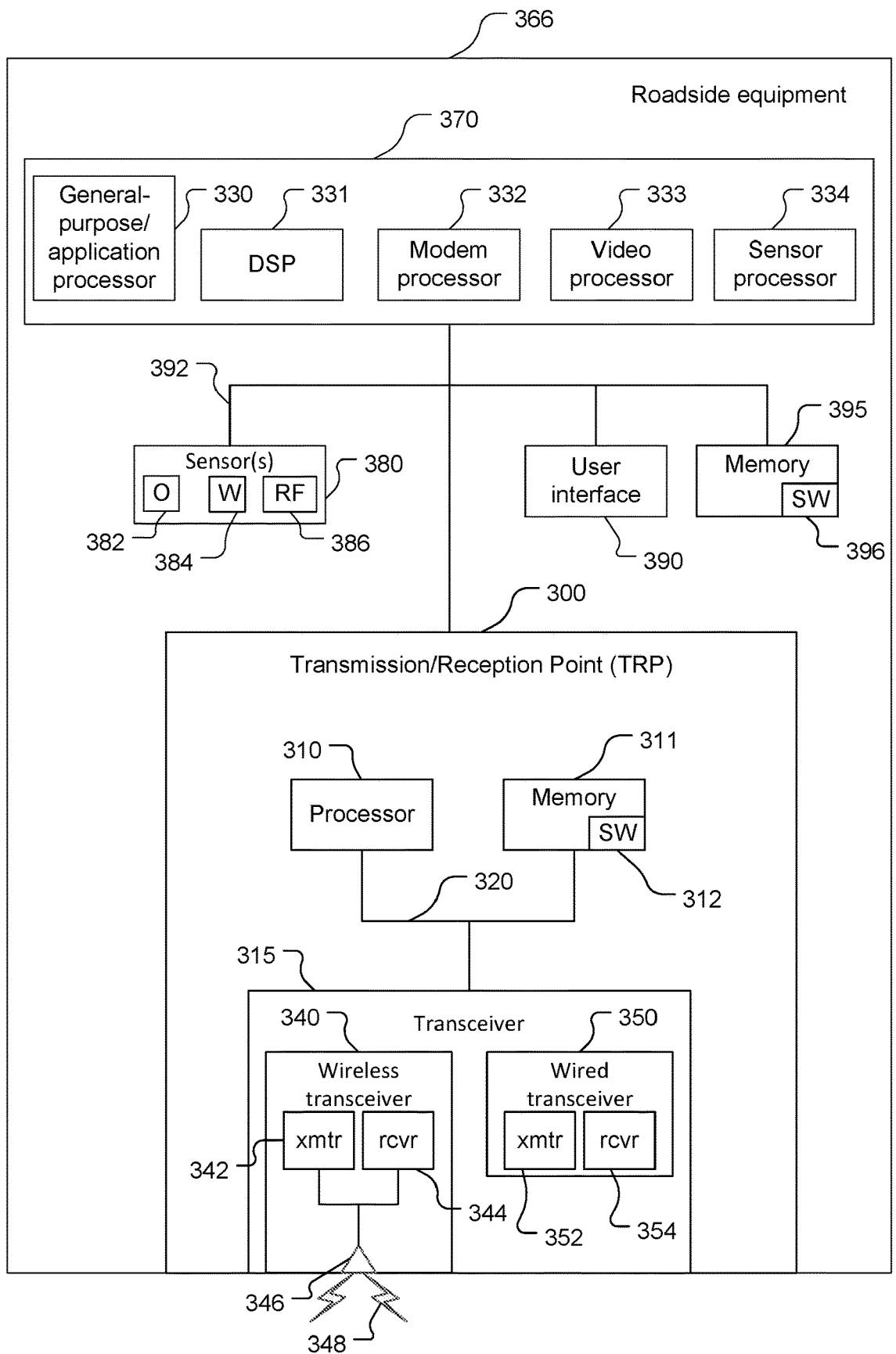
FIG. 3B is a block diagram of an example of the roadside equipment shown in FIG. 3A.

Referring also to FIG. 3B, an RSE 366, which is an example of the RSE 360 shown in FIG. 3A, includes a TRP 300, processor 370, one or more sensors 380, a user interface 390, and a memory 395 communicatively coupled to each other by a bus 392. The RSE 366 may include some or all of the components shown in FIG. 3B, and may include one or more other components.

The TRP 300 is an example of the BSs 110a, 110b, 114 and comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., with the network 135 to send communications to, and receive communications from, the LMF 120, for example. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3B is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

The processor 370 may include one or more intelligent hardware devices, e.g., a central processing unit (CPU), a microcontroller, an application specific integrated circuit (ASIC), etc. The processor 370 may comprise multiple processors including a general-purpose/application processor 330, a Digital Signal Processor (DSP) 331, a modem processor 332, a video processor 333, and/or a sensor processor 334. One or more of the processors 330-334 may comprise multiple devices (e.g., multiple processors). For example, the sensor processor 334 may comprise, e.g., processors for radar, ultrasound, and/or lidar, etc. The memory 395 is a non-transitory storage medium that may include random access memory (RAM)), flash memory, disc memory, and/or read-only memory (ROM), etc. The memory 395 stores software 396 which may be processor-readable, processor-executable software code containing instructions that are configured to, when executed, cause the processor 370 to perform various functions described herein. Alternatively, the software 396 may not be directly executable by the processor 370 but may be configured to cause the processor 370, e.g., when compiled and executed, to perform the functions. The description may refer only to the processor 370 performing a function, but this includes other implementations such as where the processor 370 executes software and/or firmware. The description may refer to the processor 370 performing a function as shorthand for one or more of the processors 330-334 performing the function. The description may refer to the RSE 366 performing a function as shorthand for one or more appropriate components of the RSE 366 performing the function. The processor 370 and the processor 310 may share one or more components. The processor 370 may include a memory with stored instructions in addition to and/or instead of the memory 395. Functionality of the processor 370 is discussed more fully below.

Figure 6:
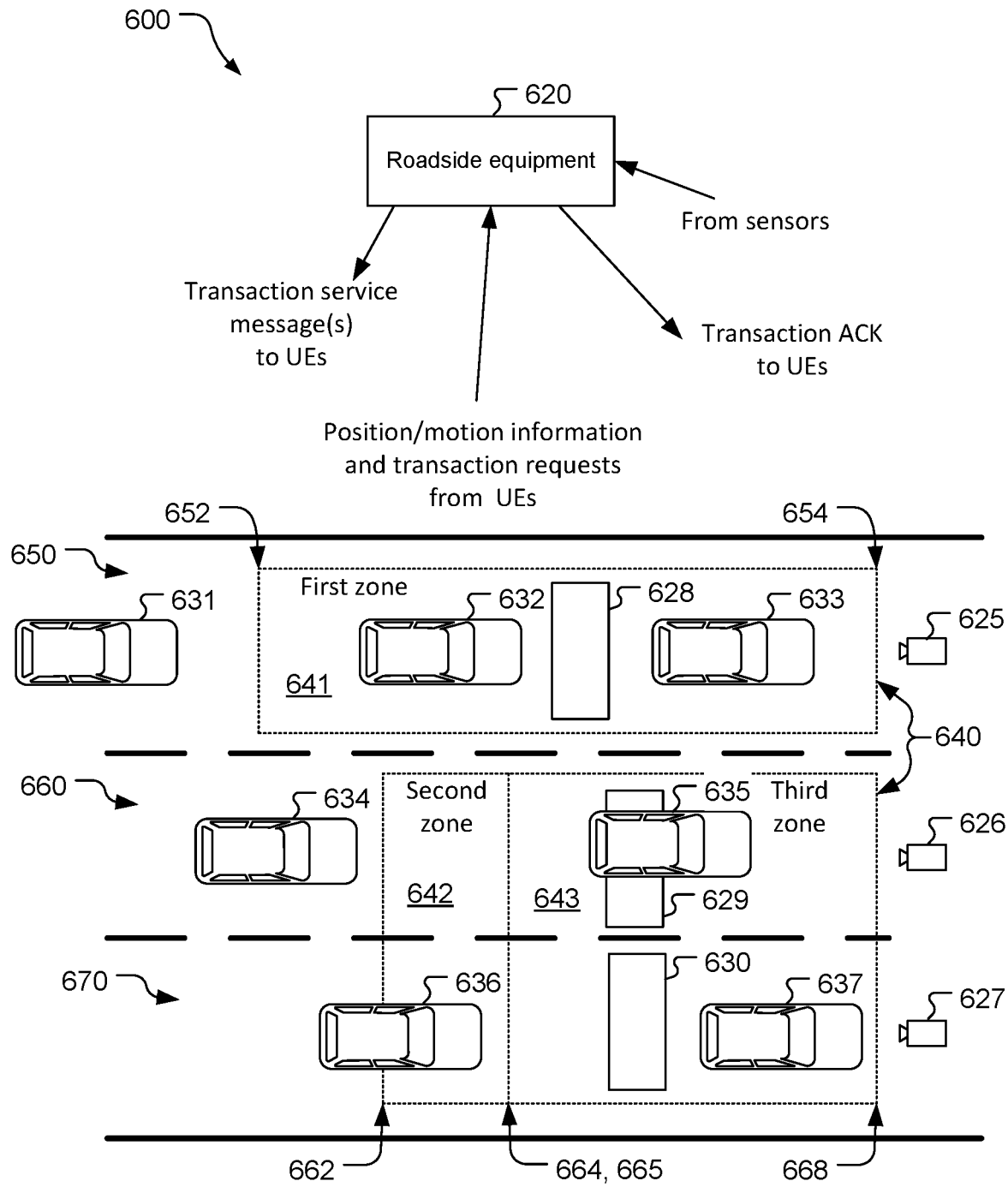
FIG. 6 is a top view of a toll-road application of the system shown in FIG. 1.

The sensor(s) 380 may include an optical sensor 382, a weight sensor 384, an RF sensor 386, and optionally one or more other sensors not shown. While only one optical sensor 382, one weight sensor 384, and one RF sensor 386 are shown in FIG. 3, and referred to herein in the singular, the optical sensor 382 may include more than one optical sensor, the weight sensor 384 may include more than one weight sensor (e.g., as shown in FIG. 6 and discussed below), and/or the RF sensor 386 may include more than one RF sensor. The optical sensor 382 may be configured to capture one or more images. For example, the optical sensor 382 may include one or more cameras. The weight sensor 384 may be configured to measure weights of objects such as UEs, and may be configured as one weight sensor or multiple separate weight sensors. The sensors 382, 384 are examples and not limiting of the description as numerous other types and/or quantities of sensors may be used. The RF sensor 386 may be disposed in or near an RF transaction region and configured to sense RF traffic associated with the RF transaction region.

The optical sensor 382 may include one or more cameras for capturing still or moving imagery. The camera(s) may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 330 and/or the DSP 331. Also or alternatively, the video processor 333 may perform conditioning, encoding, compression, and/or manipulation of signals representing captured images. The video processor 333 may decode/decompress stored image data for presentation on a display device (not shown), e.g., of the user interface 390.

The user interface 390 may comprise one or more of several devices such as, for example, a speaker, microphone, display device, vibration device, keyboard, touch screen, etc. The user interface 390 may include more than one of any of these devices. The user interface 390 may be configured to enable a user to interact with one or more applications hosted by the RSE 366. For example, the user interface 390 may store indications of analog and/or digital signals in the memory 311 to be processed by the DSP 331 and/or the general-purpose processor 330 in response to action from a user. Similarly, applications hosted on the RSE 366 may store indications of analog and/or digital signals in the memory 311 to present an output signal to a user. The user interface 390 may include an audio input/output (I/O) device comprising, for example, a speaker, a microphone, digitalto-analog circuitry, analog-to-digital circuitry, an amplifier and/or gain control circuitry (including more than one of any of these devices). Other configurations of an audio I/O device may be used. Also or alternatively, the user interface 390 may comprise one or more touch sensors responsive to touching and/or pressure, e.g., on a keyboard and/or touch screen of the user interface 390.

Figure 4:
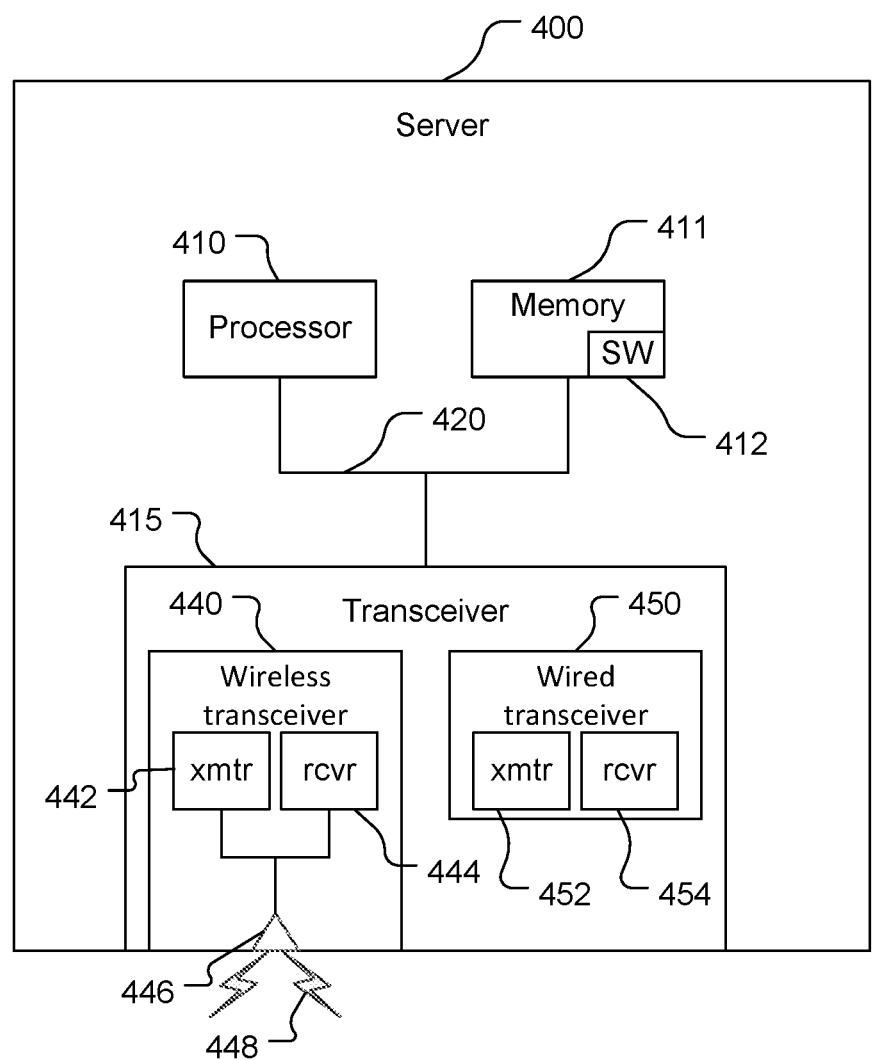
FIG. 4 is a block diagram of components of an example of a server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., with the network 135 to send communications to, and receive communications from, the TRP 300, for example. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Transaction Messaging Customization

The system 100 shown in FIG. 1 may be used for a variety of purposes. For example, the system 100 may be used to conduct transactions by exchanging information, e.g., to buy and/or sell and/or negotiate something. The UEs 105, 106 may be configured, for example, to exchange information with one or more other entities, e.g., an RSE, to complete one or more transactions.

Figure 5:
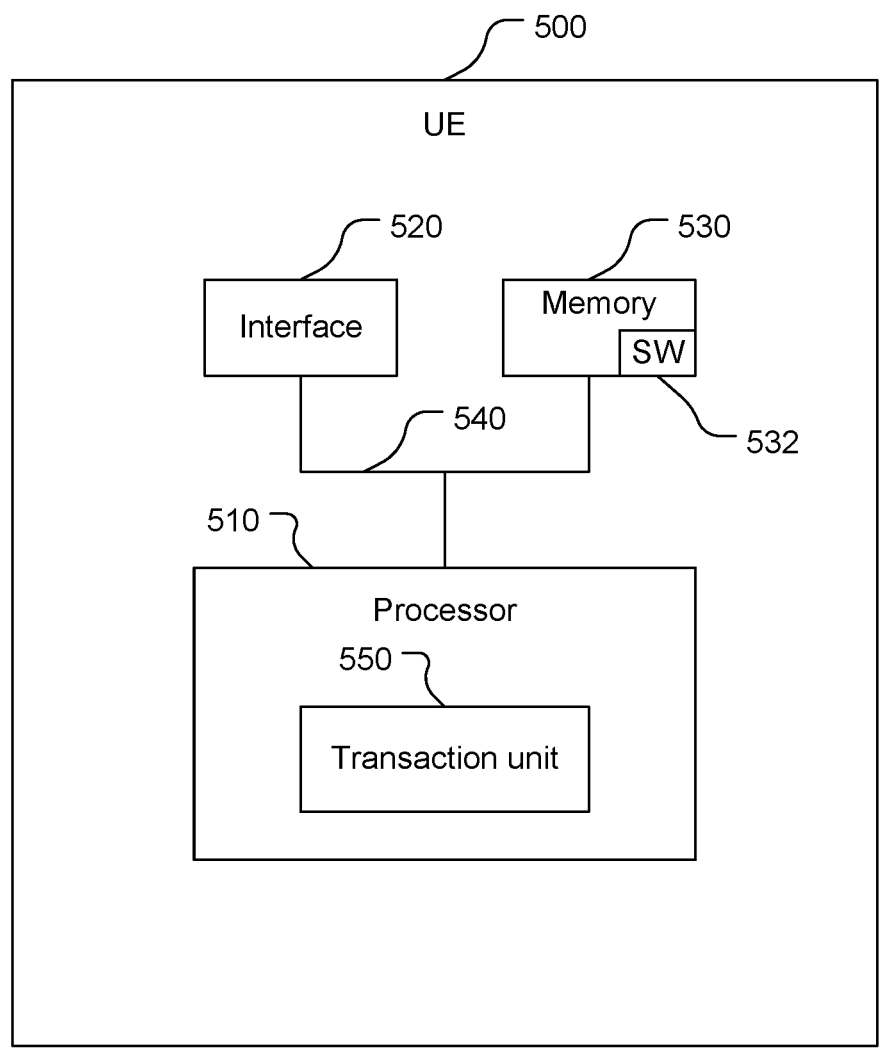
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software 532 (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a transaction unit 550. The transaction unit 550 may be configured to send one or more messages for initiating, advancing, and/or completing transactions. The configuration and functionality of the transaction unit 550 is discussed further herein.

Referring also to FIG. 6, a system 600 comprises a portion of the system 100 (FIG. 1) with the system 100 providing a transaction system. The system 600 may operate to adjust one or more transaction messaging parameters, e.g., to help improve one or more performance metrics such as successful transaction completion rates for a transaction region. The transaction region is a region corresponding to one or more associated transactions. The transaction region is a region (e.g., one-, two-, three-, or four-dimensional) from which one or more messages may originate (e.g., from one or more UEs in the transaction region) and/or in which one or more messages may terminate in (e.g., at one or more UEs in the transaction region) to request and/or initiate and/or advance and/or complete one or more transactions to be performed. A transaction region may be said to comprise multiple sub-regions with one or more common characteristics (e.g., toll collection) for the transaction region and one or more different characteristics (e.g., different toll amounts and/or different portions (e.g., areas) of the transaction region, etc.) for the different sub-regions. Alternatively, each sub-region may be considered to be a different transaction region despite the one or more shared characteristics. The transaction(s) associated with the transaction region need not be completed while the UE(s) requesting the transaction(s) is(are) in the transaction region. The transaction region may be monitored by an RSE 620 (e.g., an example of the RSE 360 or the RSE 366), and may comprise a subset of a broader region within communication range of the RSE 620. UEs may communicate with the server 400 (e.g., the LMF 120) and/or the RSE 620 to complete transactions. Transactions may be a wide variety of actions, based on information exchange, such as obtaining access to a region (e.g., a garage, parking lot, building, etc.), paying a fee (e.g., a toll for use of a road, an admission fee for access to a venue such as a parking garage, a concert hall, etc.), verifying presence of a UE in region (at a time). These features and others are described in more detail below.

In the example shown in FIG. 6, the system 100 provides a virtual toll booth with the transactions being to collect tolls from vehicles, here vehicles 631, 632, 633, 634, 635, 636, 637, that come into a radio-frequency (RF) transaction region 640 that includes a first zone 641, a second zone 642, and a third zone 643, with the zones 641-643 being sub-regions of the transaction region 640. While the RF transaction region 640 is shown as a two-dimensional area (in separate parts), an RF transaction region may be one-dimensional, three-dimensional, four-dimensional, etc. An example of a four-dimensional RF transaction region may be a three-dimensional geometry that varies over time (the fourth dimension), e.g., being schedule-based (varying according to a schedule) or adaptive (e.g., varying dynamically, e.g., as controlled by the RSE 620). The RF transaction region may be relative to a point or line in space (i.e., vector based), may be defined by multiple vertices (e.g., a polygon), and/or may be subdivided into multiple transaction regions each with a different set of performance criteria contributing to a collective performance of the parent transaction region, etc. As shown, the RF transaction region may not be contiguous. This example is discussed with vehicles being assumed as the UEs (i.e., each of the vehicles 631-637 being an example of the UE 500), but the description is applicable to other forms of UEs. In FIG. 6, the RSE 620 is shown separated from cameras 625, 626, 627 (that are parts of the optical sensor 382) and from weight sensors 628, 629, 630 (that are parts of the weight sensor 384) but the cameras 625-627 and the weight sensors 628-30 may be considered as part of the RSE 620.

The RF transaction region 640 is a region in which the vehicles 631-637 may send (e.g., broadcast) messages for the RSE 620 to attempt to trigger corresponding transactions (here, payment of corresponding tolls). The transaction may not be completed before the vehicle 631-637 leaves the RF transaction region. The system 100, and in particular the RSE 620, may try to ensure that a message is sent from each of the vehicles 631-637 that will be successfully received by the RSE 620 such that the message can be processed to enable completion of the respective transaction. For example, the RSE 620 may use an algorithm and/or a look-up table, both of which yield messaging control parameters corresponding to RF transaction region conditions, to help improve successful reception of transaction requests to thus improve requested transaction completion. A vehicle need not pass through all of the zones 641-643 to trigger the transaction. For example, it may be assumed that if a vehicle appears in any of the zones 641-643 that triggering the transaction, here, collecting the toll, is proper.

The system 100, and in particular the RSE 620, may operate (e.g., using an algorithm and/or look-up table) to attempt to increase a rate of successful completion of transactions for devices that enter the RF transaction region 640. For example, the RSE 620 may attempt to mitigate reduction in successful communication, e.g., transfer of position messages, safety messages, etc., in the RF transaction region 640 or one or more regions outside the RF transaction region 640 that may be affected by communications from the vehicles 631-637 or the RSE 620. For example, the RSE 620 may balance a desire to improve a successful transaction completion rate against a desire not to impede successful transfer of messages between components of the system 100 and/or between other devices using a frequency spectrum used by components of the system 100 for transaction messaging. The balancing performed by the RSE 620 may weight various desires differently (e.g., unevenly). For example, the desire to transfer position messages may be weighted more heavily than the desire to complete transactions successfully. The RSE 620 may affect one or more channel assignments to affect signal interaction. For example, the RSE 620 may allocate channel information to a transaction zone (e.g., to one or more of the zones 641-643) to attempt to balance spectrum congestion on a channel basis. Also or alternatively, the RSE 620 may affect a transaction zone to attempt to counteract degradation in SPS accuracy (e.g., GNSS (global navigation satellite system) HDOP (horizontal dilution of precision) values and/or GDOP (geometric dilution of precision) values). While transaction message information may be small, e.g., a few hundred bytes, the effect of sending the transaction messages may be significant, e.g., in times of high traffic, because there may be a small spectrum (e.g., 20 MHz) available for a significant region (e.g., 2 km radius), etc.

Figure 7:
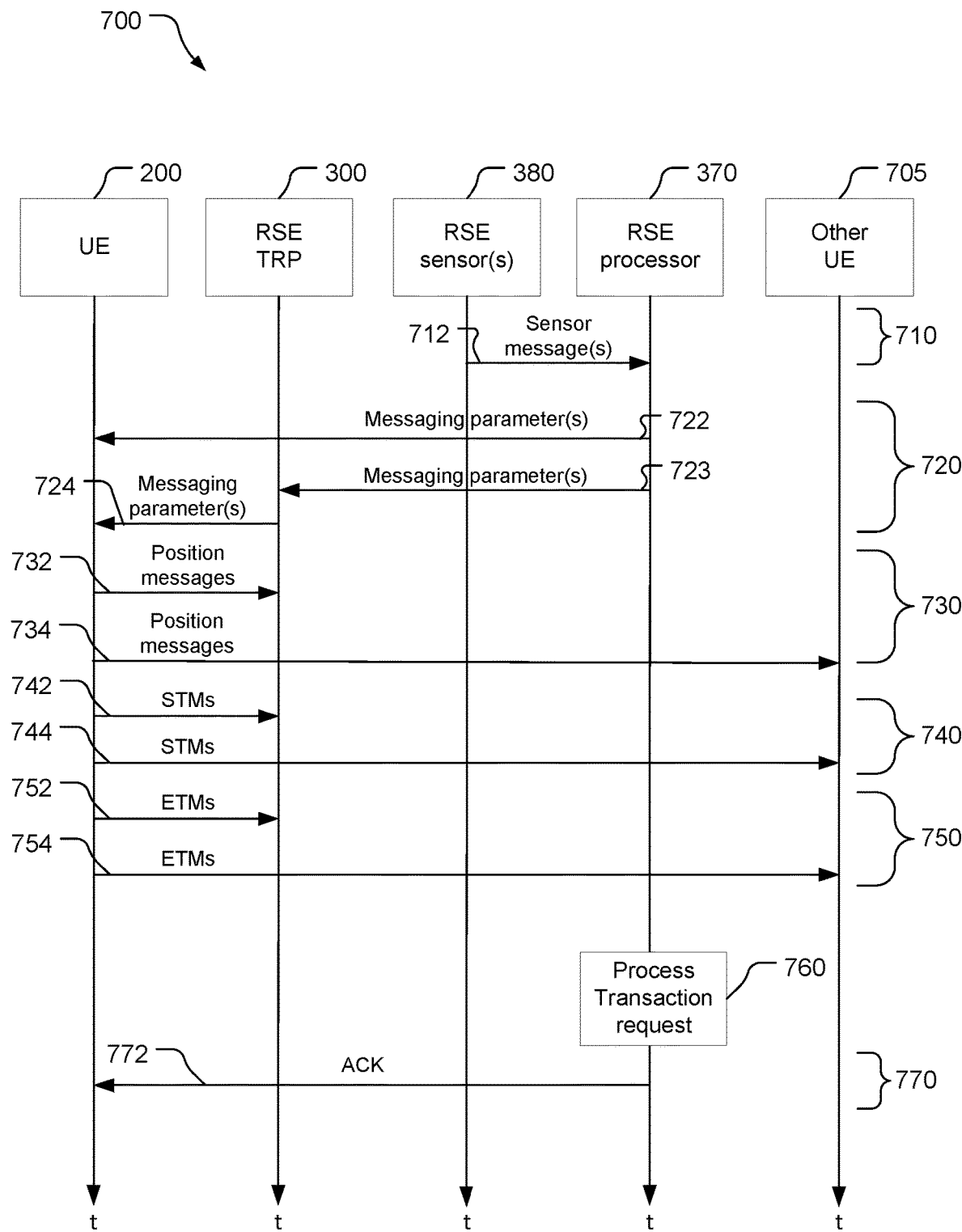
FIG. 7 is an example flow of messages between components of the system shown in FIG. 1, in particular for the example application shown in FIG. 6.

Referring also to FIG. 7, a processing and signal flow 700 for performing transactions includes the stages shown. The flow 700 is an example, and stages may be added to, removed from, and/or rearranged in the flow 700. In the flow 700, information may be transferred between components of the system 100 to complete transactions. As shown, the UE 500 (which may, for example, be any of the vehicles 631-637 or another UE), the RSE TRP 300, the RSE sensor(s) 380, the RSE processor 370, and another UE 705 (which may, for example, be an example of the UE 500 and any of the vehicles 631-637 or another UE)) of the system 100 may transfer information as discussed herein to complete transactions. Information transferred may be used for one or more other purposes as well, such as preserving privacy of UEs, providing verification of UE positions at various times, etc. One or more of the communications shown in FIG. 7 may be implemented according to one or more of a variety of radio access technologies (RATs) such as 5G New Radio (NR), GSM (Global System for Mobiles), CDMA (Code Division Multiple Access), LTE (Long-Term Evolution), LTE Direct (LTE-D), 3GPP LTE-V2X (PC5), IEEE 802.11p, WiFi, WiFi Direct (WiFi-D), Bluetooth®, etc. As discussed further below, the UE 500 may be configured to send transaction messages to the RSE processor 370 via the RSE TRP 300 to attempt to complete a transaction. The RSE processor 370 may be configured to facilitate successful receipt and processing of the transaction messages and help to ensure an acceptable successful transfer rate of one or more other message types, e.g., position messages.

The RSE processor 370 may be configured to determine information regarding the RF transaction region 640, e.g., to help improve successful transfer of information from the UE 500 to the RSE TRP 300 for completing a transaction. For example, the RSE processor 370 may determine a value of a characteristic associated with an ability of the RSE TRP 300 to obtain information sent from the UE 500 while the UE 500 is in the RF transaction region 640. For example, the RSE processor 370 may obtain information regarding an RF environment of the RF transaction region 640 and/or a loss rate of the RF transaction region 640. The loss rate is a rate at which UEs (in this example, vehicles) do not trigger a transaction but should, e.g., a ratio of a number of UEs, in a unit of time, that enter the RF transaction region 640 but do not trigger a corresponding transaction to the total number of UEs, in the unit of time, that enter the RF transaction region 640. For example, at stage 710, the RSE processor 370 may receive information from the sensor(s) 380, e.g., from the cameras 625-627 and/or the weight sensors 628-30, in one or more sensor messages 712 and analyze this information to determine a quantity of vehicles that passed through the RF transaction region 640 in a time interval. The RSE processor 370 may receive such information from one or more other sources, e.g., one or more other RSEs, one or more other sensors not associated with an RSE, etc. The RSE processor 370 may be configured to compare this determined quantity with a quantity of completed transactions based on transaction messages sent from the RF transaction region 640 during the time interval to determine the loss rate. A present loss rate may be the loss rate predicted for the present time or a loss rate determined from present measurements to the extent that the measurements are used to determine the loss rate near in time to when the measurements are taken. What constitutes near in time may depend on variability of conditions within the RF transaction region 640. For example, near in time may be within seconds or minutes for an RF transaction region in an urban setting near rush hour, or may be hours or days for a rural setting. Similarly, a present RF environment may be a predicted RF environment for the present time or the RF environment determined from present measurements. A predicted loss rate or predicted RF environment may provide loss rate or RF environment for the past, present, or future.

The RSE processor 370 may be configured to determine the RF environment in a variety of manners. For example, the RSE processor 370 may monitor (e.g., using the transceiver 315 and/or the RF sensor 386) RF signals in the RF transaction region 640. Also or alternatively, the RSE processor 370 may obtain information regarding sensed RF signals from one or more other receivers. Thus, the RSE processor 370 may monitor signals received by the transceiver 315 or the RF sensor 386, or from another receiver in or near the RF transaction region 640, to determine the present traffic in a frequency spectrum of transaction messages to be sent by the UE 500. Also or alternatively, the RSE processor 370 may be provided or otherwise obtain (e.g., from a world-wide-web page) weather conditions that may affect RF transmissions. Also or alternatively, the RSE processor 370 may be provided or otherwise obtain (e.g., determine) a schedule of predicted RF environmental conditions in the RF transaction region 640. The predicted RF environmental conditions may be based on historical RF measurements and/or other historical information (e.g., vehicle traffic conditions, weather, solar activity, etc.) corresponding to times of days, days of weeks, holidays, etc., and present and/or future expected weather conditions, present and/or future expected solar activity, etc.

The RSE processor 370 may be configured to determine, based on one or more of the characteristics discussed above and/or one or more other factors (such as those discussed below), one or more values of one or more corresponding messaging parameters affecting messaging relative to the RF transaction region 640. The value(s) of the parameter(s) may affect the ability of the RSE 620 to obtain information sent from the UE 500 while in the RF transaction region 640. The value(s) of the parameter(s) may be the same for all UEs, e.g., with the RSE processor 370 causing the RSE 620 to broadcast the parameter value(s). Different values of parameters may be determined and implemented (e.g., broadcast to UEs) for different portions of the RF transaction region 640, e.g., the different zones 641-643.

For example, the RSE processor 370 may determine one or more messaging parameters as a perimeter of the RF transaction region 640. The perimeter may be two dimensional, or three dimensional, and may comprise one or more contiguous portions, or one or more contiguous portions and one or more separate portions. Three-dimensional regions may be used for a variety of applications (including land-based applications) but may be of particular use for airborne applications (e.g., for aircraft such as drones) or water-based applications (e.g., for monitoring aquatic life or under-water vehicles). The perimeter may be determined as a function of, e.g., in addition to or instead of RF environment and loss rate, vehicle speed and separation (which may affect loss rate), as well as one or more other factors. The RF transaction region 640 comprises one contiguous portion, the zone 641, as well as two contiguous portions, the zones 642 and 643, that are separate from the other contiguous portion, i.e., the zone 641. For separate portions, e.g., the zones 641, 642, the perimeter definition may include a separation (distance) between the portions. The perimeter parameter(s) may, for example, indicate a start position and an end position. For example, the perimeter parameter(s) may indicate a start position 652 and an end position 654 in a lane 650 for the zone 641, a start position 662 and an end position 664 across lanes 660, 670 for the zone 642, a start position 665 and an end position 668 across the lanes 660, 670 for the zone 643. In this example, the end position 664 and the start position 665 are the same position. The perimeter parameter(s) may be provided in a variety of manners such as in terms of a set of vertexes. The start positions 652, 662, 665 and the end positions 654, 664, 668 may be provided in terms of distances from a reference location in the lanes 650, 660 respectively. Still other examples may be used.

As another example, the RSE processor 370 may be configured to determine a messaging parameter as a minimum number of transaction messages to be sent by the UE 500 while in the RF transaction region 640. For example, the RSE processor 370 may provide a messaging parameter specific to a transaction zone, such as one of the zones 641-643, and may provide different messaging parameters to different transaction zones. The RSE processor 370 may determine, e.g., based on the RF environment, the loss rate, and/or vehicle speeds (e.g., average vehicle speed), a minimum number of messages for the UE 500 to send, e.g., to achieve a desired loss rate or less (i.e., at least a desired success rate). Having a low loss rate may be desirable to help reduce expense in completing transactions. For example, for transactions not completed using transaction messages, corresponding vehicles may need to be identified from one or images from the sensor(s) 380 (e.g., one or more of the cameras 625-627) to determine associated information (e.g., a payment account). Human review (estimated to be 40% for image review) may be used to identify the vehicle or determine other information, which increases expense in completing the transaction. The UE 500 may be configured to provide information (e.g., in a transaction message or a position message) about the UE 500 (e.g., dimensions of a vehicle) that may be used by the RSE 620 (e.g., a camera's optical recognition (e.g., optical character recognition) algorithm). This may improve automated identification of the UE 500 (e.g., reading of a license plate number) to reduce manual intervention in optical identification of the UE 500 (and thus identification of a corresponding account).

As another example, the RSE processor 370 may be configured to determine a messaging parameter as a maximum number of transaction messages to be sent by the UE 500 while in the RF transaction region 640. For example, the RSE processor 370 may determine a maximum number of messages to be sent by the UE 500 to help ensure at least a threshold success rate of transfer of other messages (e.g., messages for advertising, triggering, and/or acknowledging one or more corresponding transactions) sent by the UE 500 in the frequency spectrum of transaction messages. The RSE processor 370 may determine the maximum number of transaction messages to help keep the RF environment desirable, e.g., to keep interference below a threshold level. The RSE processor 370 may base the determination of the messaging parameter on various factors, e.g., that may degrade signal quality and/or cause multi-path signaling, such as the physical environment (including physical objects (e.g., bridges and/or barriers) and/or topographical features) in or near the RF transaction region 640.

As another example, the RSE processor 370 may be configured to determine a messaging parameter as a rate of transaction messages to be sent by the UE 500 while in the RF transaction region 640. For example, the RSE processor 370 may determine the rate as a function not only of the RF environment and/or the loss rate, but of vehicle speed (e.g., average vehicle speed) and/or transmission power and/or one or more other factors. The RSE processor 370 may determine a rate that is directly (although not necessarily linearly) proportional to the vehicle speed, with faster speeds resulting in higher rates of message transmissions (i.e., more messages transmitting per unit of time). The RSE processor 370 may determine the transaction rate to attempt to have at least a minimum number of transaction messages be sent by the UE 500 while the UE 500 is in the transaction region 640. The RSE processor 370 may determine the rate as a standalone value, or as a duty cycle of other messages (e.g., a rate of other messages, such as position messages) in which to include transaction message information. For example, with the UE 500 configured to send position messages at a rate of 10 Hz, the RSE processor 370 may determine a transaction message rate of a 10% duty cycle, e.g., one in every ten position messages are to include a transaction message.

As another example, the RSE processor 370 may be configured to determine a messaging parameter as a transmission power to be used by the UE 500 to transmit transaction messages while in the RF transaction region 640. For example, the RSE processor 370 may determine the transmission power based not only on the RF environment and loss rate, but the amount of UEs passing through the RF transaction region 640 and/or a rate of message transmissions and/or one or more other factors, e.g., to keep unsuccessful transfers of one or more other signal types, e.g., position messages, at an acceptable rate.

The RSE processor 370 may be configured to determine combinations of the parameters. For example, as discussed above, the RSE processor 370 may be configured to determine a combination of message transfer rate and transmission power. Indeed, the RSE processor 370 may be configured to determine a combination of any combination of two or more parameters (including the parameters mentioned above and/or one or more other parameters not mentioned). As another example, the RSE processor 370 may analyze a combination of message transfer rate and RF transaction region size (and possibly UE speed and direction). As the size of the RF transaction region 640 increases, e.g., as a length of the zone 641 increases or a length of the combination of the zones 642, 643 increases, the rate of successfully transferred transaction messages will (typically) increase, but so may RF interference and thus successful transfer of other signals (e.g., communications or position/method messages, discussed more below) may decrease. Indeed, the longer zones may have some negative effect on transfer of the transaction messages even if overall success rate increases. Also, as a rate of transaction messages from UEs increases, the success rate of transaction message transfer may increase while again possibly negatively affection other signals (and even transaction messages).

The RSE processor 370 may be configured to provide one or more parameter values to the UE 500, which in this example may be any of the vehicles 631-637, via the RSE 620 or by other means, e.g., the network 135. For example, the RSE processor 370 may be configured to provide the parameter(s) in a parameter message 722 at stage 720 to the UE 500. For example, the RSE processor 370 may provide the parameter(s) to a web page and the UE 500 may download the parameter(s) from the web page. Also or alternatively, the RSE processor 370 may be configured to send a parameter message 723 at stage 720 including the one or more parameter value(s) to the RSE 620 via the network 135 (not shown in FIG. 7), and the RSE 620 may send a parameter message 724 at stage 720 to the UE 500 with the parameter(s). The parameter messages 722-724 may be called transaction service messages. The parameter message 722 may be sent using any of a variety of RATs such as 802.11, Bluetooth®, WiFi, etc. The UE 500 may obtain the parameter(s) well in advance (e.g., hours or days) of entering the RF transaction region 640. The UE 500 may obtain one or more parameters well in advance of entering the RF transaction region 640 and/or one or more parameters when in close proximity to, and/or shortly before entering, the RF transaction region 640. For example, the parameter(s) obtained by the UE 500 from the RSE 620 may be obtained when in close proximity to the RF transaction region 640 even if the UE 500 does not soon thereafter, or ever, enter the RF transaction region 640.

The UE 500 (e.g., the processor 210 and the transceiver 215) may be configured to obtain the parameters for the RF transaction region 640. The UE 500 may access a web page and download parameters, e.g., at any time regardless of location or whether the UE 500 may be entering the RF transaction region 640. The UE 500 may obtain parameters for future times and/or parameters that are fixed. The UE 500 may obtain parameters from the RSE processor 370 (e.g., via the network 135) in the parameter message 722 and/or from the RSE TRP 300 in the parameter message 724. The UE 500 may obtain parameters from the RSE 620 as the parameters may change over time, sometimes rapidly (e.g., in response to rapid changes in traffic congestion, e.g., due to an accident).

The UE 500 may be configured to send various types of messages to the RSE TRP 300 and/or to other UEs such as the UE 705. The UE 500 may be configured to broadcast these messages for receipt by any device within communication range (based on the RAT used to transmit the messages and other conditions, e.g., environment, weather, etc.) of the UE 500. For example, the UE 500 may be configured to produce and send, at stage 730, position messages 732, 734, at stage 740, standalone transaction messages (STMs) 742, 744, and at stage 750, embedded transaction messages (ETMs) 752, 754 that are transaction messages embedded in position messages. The STMSs 742, 744 include private information, e.g., a token, that is associated with and identifies the UE 500 (e.g., that includes subscription information) so that a transaction is initiated/completed only if authorized for that UE 500 (e.g., an owner or account associated with the UE 500 is charged a fee, or a physical barrier (e.g., a gate) is moved if the UE 500 is authorized for passage beyond the barrier, etc.). The STMs 742, 744 are shown in FIG. 7 as only going to the RSE TRP 300 and the UE 705, but these messages may be ignored by the other UE 705 or relayed as discussed more fully below. The position messages 732, 734 and the ETMs 752, 754 include position information (possibly including uncertainty and/or error) for the UE. The position information may include motion information (i.e., changing-position information) for the UE. For example, the position messages 732, 734 and the ETMs 752, 754 may include a position of the UE relative to a reference point (e.g., center of the Earth, or a point on a surface of the Earth, etc.), one or more reference signal measurements, and/or information indicative of kinematic state of the UE 500, e.g., a velocity vector and/or an acceleration vector. The position messages 732, 734 may comprise Basic Safety Messages (BSMs) and/or other messages. The position messages 732, 734 may be conveyed, e.g., using V2X technology such as C-V2X and/or DSRC. The ETMs 752, 754 may include the position information (possibly including motion information) as well as private information identifying the UE 500 as found in STMs. The position and/or motion information of the position messages 732, 734 and/or the ETMs 752, 754 may be used by the other UE 705 for various purposes such as collision avoidance (e.g., blind-zone object detection), other safety-related purposes, and/or other purposes whether safety related or not. The STMs 742, 744 and the ETMs 752, 754 are discussed further below with respect to the discussion of cryptographic binding.

The UE 500 may be configured to act as a "leader" and aggregate information from one or more other UEs and send information for the UE 500 and the one or more other UEs in the transaction message(s) from the UE 500. For example, the UE 500 may receive transaction messages with encrypted tokens from other UEs and produce a composite transaction message (as either one of the STMs 742, 744 or the ETMs 752, 754). The composite transaction message includes composite identifying information including identifying information for the UE 500 and identifying information (e.g., the encrypted token(s)) of one or more other UEs from which the UE 500 received identifying information. The UE 500 may form a composite token with the token of the UE 500 and the one or more received (encrypted) token(s). The UE 500 may send the composite transaction message to the RSE 620. For the STMs, the token from another UE may be encrypted twice as part of an encrypted token, once by the other UE and once by the UE 500 using the public key of the RSE 620 (or other entity), and the RSE 620 (or other entity) can decrypt twice using the corresponding private key. For the ETMs, the token of the other UE(s) may or may not be encrypted twice depending whether the UE 500 encrypts the other token(s) with the token of the UE 500 or encrypts the token of the UE 500 and forms the composite token without further encrypting (i.e., in addition to the encryption done by the other UE(s)) the other token(s). The UE 500 may receive the information from the other UEs and/or produce the composite transaction message before entering the transaction region 640. The UE 500 may determine which other UEs enter the transaction region 640 (e.g., by analyzing position messages) and only send composite messages including identifying information for UEs that enter the transaction region 640. Alternatively, the UE 500 may send the composite message in response to entering the transaction region 640 regardless of whether other UEs whose identifying information is in the composite message ever enter the transaction region 640. In this case, the UE 500 may rely on the RSE 620 to initiate transactions only for UEs that enter the transaction region 640 (e.g., only for UEs from whom the RSE 620 receives position messages indicating that those UEs entered the transaction region 640). In response to the UE 500 sending, or being expected to send, the composite message, one or more of the other UEs may not send transaction messages, or may send fewer transaction messages than the UE(s) otherwise would. This may reduce RF traffic and improve successful communication in the transaction region 640 and/or in the vicinity of the transaction region 640. More than one UE may act as a "leader" and send respective composite messages, and the composite messages from different UEs may be the same or different. Different composite messages may have identifying information from all of the same UEs, or from overlapping (intersecting) sets of UEs, with some of the same UEs having their identifying information in both of the different composite messages. Thus, redundant information may be received from different UEs to help ensure initiation of transactions that should be initiated.

The position messages 732, 734 are shown as being sent to the RSE TRP 300 and the UE 705 separately but may be the same messages being broadcast but received by the RSE TRP 300 and the UE 705. The same applies for the STM messages 742, 744 and the ETM messages 752, 754. The RSE 620 may, however, be configured to ignore the position messages 732, 734.

Transmission (and possibly production) of at least the STMs 742, 744 and the ETMs 752, 754 by the UE 500 may be controlled by the messaging parameter(s) in the parameter messages 722, 724 received by the UE 500. The UE 500 may respond to the messaging parameter(s) in the parameter messages 722, 724 by controlling where (e.g., in the RF transaction region 640), when (e.g., how often), how many (e.g., minimum and/or maximum number of transmissions), and/or how (e.g., transmission power level) the UE 500 sends the STMs 742, 744 and/or the ETMs 752, 754. The STMs 742, 744 and the ETMs 752, 754 may be referred to as transaction messages or transaction request messages as the STMs 742, 744 and the ETMs 752, 754 may at least implicitly request a transaction, e.g., by providing the private information (e.g., the token).

The transmission of the position messages 732, 734 may be controlled. For example, the UE 500 may send the position messages 732, 734 in accordance with (e.g., at a rate) a control message sent by the RSE processor 370 or some other entity (e.g., the server 400 and/or a server dedicated to position message control). The RSE processor 370 may send the control message as part of the parameter message 723. The RSE processor 370 may instruct the UE 500 to adjust a rate of the position messages 732, 734 for a variety of reasons. For example, the RSE processor 370 may instruct the UE 500 to reduce a frequency of sending the position messages 732, 734 to reduce interference with the STMs 742, 744 and/or the ETMs 752, 754, to reduce unnecessary RF traffic (e.g., if there is a vehicle traffic jam, then less frequently than position messages 732, 734 may be adequate), etc. The RSE processor 370 may instruct the UE 500 to increase or decrease the frequency of sending the position messages 732, 734 as a function of the speed of the UE 500. The RSE processor 370 may provide the UE 500 with a formula for determining the frequency at which to send the position messages 732, 734, that is a function of the speed of the UE 500, and the UE 500 may be configured to determine the frequency and apply the frequency to the transmission of the position messages 732, 734.

While FIG. 7 shows a message exchange over time, with the passage of time moving downward in FIG. 7, the timing of the messages shown is an example, and other timings are possible. For example, the parameter messages 723, 724 may be sent multiple times, including after one or more of the messages 732, 734, 742, 744, 752, 754 have been sent. As another example, each of the messages 732, 734, 742, 744, 752, 754 may be sent multiple times, and when and how the messages 732, 734, 742, 744, 752, 754 are sent may change (e.g., while the UE 500 is in the RF transaction region 640) based on the received messaging parameter(s).

Cryptographic Binding of Transaction Requestor and Position Reports

A transaction message and a position message from the UE 500 may be cryptographically bound. The cryptographic (or other) binding positively associates the position message (and thus the UE 500) and the transaction message (e.g., a token for the UE 500 or a composite token including the token for the UE 500 and one or more other tokens received by the UE 500 and included in the transaction message) which may help with enforcement, e.g., transaction completion, and/or non-repudiation (e.g., assurance that an owner of the UE 500 cannot successfully deny presence of the UE 500 in the RF transaction region 640, or cannot successfully assert false presence of the UE 500 in the RF transaction region 640). The discussion below focuses on binding of the token for the UE 500, but the discussion applies equally well to composite tokens. Cryptographic binding may be accomplished by digitally signing the position message and the transaction message (e.g., a token of a transaction message) with the same digital certificate, as discussed below, although other cryptographic binding techniques may be used that link the position reporting identity of the sender with that of the origination of the transaction message.

The UE 500 may be configured to provide privacy to the information sent in the position messages 732, 734, the STMs 742, 744, and/or the ETMs 752, 754. The privacy provided to the different types of the messages 732, 734, 742, 744, 752, 754 may differ, e.g., in accordance with the different types of information contained in the different messages. For example, the UE 500 may be configured to provide encryption not provided to the position messages 732, 734, e.g., to encrypt private information of the STMs 742, 744 and/or the ETMs 752, 754.

For the position messages 732, 734, the UE 500 may digitally sign the position messages 732, 734 with a digital certificate. For example, the position messages 732, 734 may be signed by the UE 500 using a pseudonym certificate, e.g., per IEEE 1609.2, to provide a level of privacy to the information without providing an identity of the UE 500 (e.g., to inhibit tracking of the UE 500). The UE 500 may change the digital certificate over time, e.g., every five minutes or some other amount of time (with the amount of time possibly varying). The UE 500 may not change the certificate while in the RF transaction region (e.g., the RSE 620 may broadcast an instruction, that the UE 500 follows, not to change the certificate while the UE 500 is in the RF transaction region 640).

For the STMs 742, 744, the UE 500 may digitally sign the STMs with a digital certificate. The UE 500 may digitally sign the STMs 742, 744 with the same digital certificate that the UE 500 uses to digitally sign the position messages 732, 734. By doing so, the UE 500 cryptographically binds the transaction message and thus the UE 500 (the transaction requestor) with the position messages 732, 734. The UE 500 may sign the STM 742, 744 before or after the UE 500 performs encryption on the STM 742, 744, or a portion thereof.

The UE 500 may be configured to encrypt at least private information of the STMs 742, 744. For example, the UE 500 may encrypt a token for the STM 742, 744, e.g., to encrypt an account number and/or license plate number associated with the UE 500. The UE 500 may encrypt the token and produce the STM 742, 744 using the encrypted token. The UE may digitally sign the STM with the encrypted private information contained therein. Also or alternatively, the UE 500 may be configured to encrypt the entire STM 742, 744 as opposed to just the private information, e.g., the token. For example, the UE 500 may be configured to digitally sign the STM 742, 744 and to encrypt the entire, digitally-signed, STM 742, 744. The UE 500 may use a public encryption key associated with the RSE 620 (or another entity such as a back-end (e.g., core network) entity such as the server 400) to perform the encryption (e.g., of the token, of the digitally-signed STM 742, 744, etc.). The UE 500 may obtain the public encryption key from the RSE 620, e.g., as broadcast by the RSE TRP 300, or by other means, e.g., by downloading the public encryption key from a web page (e.g., before coming within communication range of the RSE TRP 300). The UE 500 may be configured to produce at least portions of the STMs 742, 744 in advance of being in the RF transaction region 640. For example, the UE 500 may produce all of an STM 742, 744 except for a timestamp and then add the timestamp before (e.g., just before) broadcasting the STM 742, 744.

For the ETMs 752, 754, the UE 500 may encrypt the embedded transaction messages, or at least the private information of the transaction messages, and digitally sign the ETMs with a digital certificate. The UE 500 may digitally sign the ETMs 752, 754 with the same digital certificate that the UE 500 uses to digitally sign the position messages 732, 734. As with the STMs 742, 744, by signing with the same digital certificate, the UE 500 cryptographically binds the UE 500 (the transaction requestor) with the position messages 732, 734. The UE 500 may be configured to encrypt at least private information of the transaction message to be embedded as part of the ETM 752, 754. For example, the UE 500 may encrypt the token using the public encryption key of the RSE 620, combine the encrypted token with position information to form the ETM 752, 754, and digitally sign the ETM with the encrypted private information contained therein. The UE 500 may be configured to produce the encrypted private information of the ETMs 752, 754 in advance of being in the RF transaction region 640. For example, the UE 500 may encrypt the token and obtain position information once in or near the RF transaction region 640 and combine the position information with the encrypted token and a timestamp to form the ETM 752, 754, and digitally sign and broadcast the ETM 752, 754.

The RSE processor 370 may be configured to process a transaction request as shown at stage 760 of FIG. 7. For example, the RSE processor 370 may analyze a successfully received STM 742, 744 or ETM 752, 754 to determine whether the UE 500 is authorized for the requested transaction (e.g., whether an owner of the identified UE 500 is authorized to access a venue, whether an identified account is valid and/or has sufficient funds for a transaction fee, e.g., a toll, etc.). The RSE processor 370 may be configured to decrypt information from the UE 500 (e.g., in the STM 742, 744 or the ETM 752, 754) that is encrypted with the public encryption key associated with the RSE 620. The RSE processor 370 may be configured to store (e.g., cache) (e.g., in the memory 395) information from the position messages 732, 734 and the STMs 742, 744 and/or the ETMs 752, 754 and compare the position messages 732, 734 to the STMs 742, 744 and/or the ETMs 752, 754. The RSE processor 370 may be configured to determine whether at least one position messages 732, 734 was received from the RF transaction region 640 signed by the same digital certificate as at least one of the STMs 742, 744 or at least one of the ETMs 752, 754. The RSE processor 370 may require that different message types (position message vs. STM or ETM) signed by the same digital certificate be sent from the RF transaction region 640 within a time window, e.g., a typical amount of time for a UE to traverse the RF transaction region 640 at the time of transmission of the messages. The RSE processor 370 may be configured to deny the requested transaction or otherwise not complete the requested transaction if no such pair of different types of messages were sent from the RF transaction region 640 signed by the same certificate. The RSE processor 370 may be configured not to decrypt information (e.g., the token) of the STM or ETM that was encrypted using the public encryption key associated with the RSE 620 if no such pair of different types of messages were sent from the RF transaction region 640 signed by the same certificate (e.g., if the RSE processor 370 does not determine that the position message was signed using the same certificate as either the STM or the ETM).

The RSE processor 370 may be configured to process transaction requests that are not digitally signed or encrypted. The RSE processor 370 may process an STM 742, 744 or an ETM 752, 754 that has not been digitally signed. The RSE processor 370 may not require that an STM 742, 744 or an ETM 752, 754 is signed with a digital certificate that is also used to sign a position message 732, 734, even though it may be desirable to require this. The RSE processor 370 may process identifying information of a transaction request that has not been encrypted, even though not encrypting the identifying information may lead to undesirable consequences, such as accessing a user account or tracking the UE 500.

The RSE processor 370 may send, e.g., via the transceiver 315, an acknowledgement ACK message 772 to the UE 500 at stage 770. The ACK message 772 may be sent once or multiple times, and may be encrypted such that only the UE 500 for which the ACK message 772 is relevant may decrypt the ACK message 772. For example, the RSE processor 370 may encrypt the ACK message 772 using the public encryption key of the UE 500 (e.g., provided to the RSE 620 by the UE 500 in the token in the STM 742, 744 and/or ETM 752, 754) or using/referencing a pre-configured symmetric encryption key. The ACK message 772 may indicate to the UE 500 that a transaction message has been received to trigger a desired transaction. The ACK message 772 may indicate that a received transaction message was successful in triggering the desired transaction, or even that the desired transaction has been completed. The ACK message 772 may indicate to (or instruct) the UE 500 to stop sending further transaction messages (e.g., STMs 742, 744 or ETMs 752, 754). The UE 500 may respond to receiving (and decrypting) the ACK message 772 while in the RF transaction region 640 by discontinuing broadcasting any further transaction messages (for the RF transaction region 640). The ACK message 772 may indicate to stop sending further transaction messages while the UE 500 is in the RF transaction region 640. The ACK message 772 may indicate a particular transaction for which to stop sending transaction messages so that if RF transaction regions overlap, the UE 500 may determine to discontinue sending transaction messages for the particular transaction, e.g., while in the RF transaction region corresponding to the particular transaction.

The RSE processor 370 may embed the ACK message 772 in another message. For example, the RSE processor 370 may embed the ACK message 772 (e.g., at least the relevant, e.g., payload, portion thereof) in a standard message that the RSE 620 will broadcast regardless of interaction with the UE 500. For example, the RSE processor 370 may embed the ACK message 772 in a message conveying signal phase, map, and/or other content, and/or in the parameter message 723.

UE Position Confirmation

The system 100 may be configured to confirm a position, e.g., a historical position, of a UE. The position may be confirmed through the use of the RSE 620 or without the use of the RSE 620. The position may be a point or a region such as the RF transaction region 640 or a portion thereof. The system 100 may use information shared between neighbor UEs to confirm the location of a UE at a particular time (e.g., a point in time or within a time window). For example, the UE 500 may share information with the UE 705 and the UE 705 may share information with the UE 500, and this shared information may be compared to confirm that the UE 500 was in communication range of the UE 705, e.g., at a time associated with timestamps of the stored information. For example, a peer-to-peer protocol may be used for the UE 500 and the UE 705 to communicate. For example, the UEs 500, 705 may be configured to communicate with each other using the 3GPP LTE-V2X (PC5) (i.e., LTE sidelink) and/or the IEEE 802.11p technologies.

The UE 500 may be configured to store information that the UE 500 receives from other UEs such as the UE 705. For example, the UE 500 may store some or all information of one or more of the position messages 732, 734 received from the UE 705. Similarly, the UE 705 may store some or all information of one or more of the position messages 732, 734 received from the UE 500. The UE 500 may be instructed to save only information from neighboring UEs (e.g., those from which information is received wirelessly and thus those within communication range) received while the UE 500 is in the RF transaction region 640. The UE 500 may be instructed to collect information (e.g., ephemeral, non-repeating information) from other UEs based on locations of the other UEs, e.g., only if the other UEs are in the RF transaction region 640, or from one or more UEs regardless of location or a combination thereof (e.g., to collect information from at least three UEs in the RF transaction region 640). The UE 500 may be configured to store information from the position messages 732, 734 in accordance with one or more instructions received from the RSE 620, e.g., included with the parameter message 722 or the parameter message 724 or some other message, or received from another entity (e.g., the server 400). That is, the instruction(s) may control what information from other UEs that the UE 500 will store. Also or alternatively, the instruction(s) may control a minimum and/or a maximum number of neighbor UEs from which to save information. The instruction(s) may be different over time, e.g., instructing different information to collect/save and/or different quantities of UEs from which to save information, etc. The UE 500 may collect information from one or more UEs not in the RF transaction region 640. The UE 500 may be configured to save and report information from less than all position messages received from another UE. The frequency with which to store information from the other UE (which may be an instruction regarding all other UEs) may be controlled by the instruction(s) received by the UE 500 or may be stored within the UE 500 (e.g., as a manufacturer setting). The UE 500 may be configured (e.g., by the received instruction(s)) to limit the number of other UEs from which to collect and save information while the UE 500 is in the RF transaction region 640.

The information collected from other UEs may be reported by the UE 500 for use in confirming the location of the UE 500, e.g., for transaction processing, or purely location verification, etc. For example, the UE 500 may report other UE information (e.g., information from one or more other UEs alleged to neighbor the UE 500) as part of the STMs 742, 744 and/or as part of the ETMs 752, 754. The RSE processor 370 may be configured to compare the neighbor UE information in the STM 742, 744 or the ETM 752, 754 processed by the processor 310 with the neighbor UE information reported for a similar time by one or more of the UEs corresponding to the neighbor UE information in the STM 742, 744 or the ETM 752, 754. The RSE processor 370 may deny a requested transaction if information of the UE 500 does not appear in the neighbor list(s), for the same or similar time as the STM 742, 744 or ETM 752, 754, of the neighbor UE(s) corresponding to the neighbor UE information provided in the STM 742, 744 or the ETM 752, 754. The RSE processor 370 may store verification of the UE 500 being within the RF transaction region 640 if the neighbor UE list(s) of the neighbor UE(s) include(s) information corresponding to the UE 500. The RSE processor 370 may save the verification (which may be an indication of completion, or at least authorization for completion, of the transaction). In some cases, the ACK message 772 may serve as a verification of the UE 500 being within the RF transaction region 640. The RSE processor 370 may discard (e.g., not save) the information from the STM 742, 744 or the ETM 752, 754 or the neighbor list(s) from the neighbor UE(s), e.g., in response to saving the verification. The comparison done by the RSE processor 370 may also be used to confirm (or deny) that the UE 500 was at a particular position at the time of the STM 742, 744 or the ETM 752, 754. Also or alternatively, one or more of the storing and comparing functions (or portions thereof) for confirming location of the UE 500 may be performed by one or more other devices, e.g., one or more other RSEs and/or one or more back-end devices such as the server 400.

Information collected from other UEs may be reported by the UE 500 and used in confirming the location of the UE 500 even without the use of the RSE 620. For example, the UE 500 may report collected information to a device, such as a back-end device, for analysis via another RSE, or via cellular communication, or WiFi communication, or use of one or more other RATs, or a combination thereof. For example, the information from the UE 500 may be relayed through multiple UEs as part of a path from the UE 500 to the device for analysis of the information.

Applications

Techniques discussed herein may be used for a wide variety of applications, e.g., applications for secure transactions that are geographically based. For example, techniques discussed herein may be applied to systems with physical barriers such as parking garage gates, turnstiles, doors, etc., for example to ensure payment of a fee to remove the barrier to allow access that is inhibited by the barrier. As another example, a fee (e.g., a toll) could be charged for road usage, even beyond toll roads. For example, position of a UE may be tracked (e.g., by confirming position of the UE over time using neighbor lists as discussed) and a road use charge (RUC) tallied based on usage of roads, e.g., by the UE (e.g., if the UE is a vehicle) or a device (e.g., vehicle) associated with the UE. Fees could be reduced based on paying a fee associated with an RF transaction region. For example, information regarding payment of a fee for a toll road corresponding to an RF transaction region may be sent to a server that controls RUCs and an RUC corresponding to a UE may be reduced based on payment for use of the toll road.

Techniques discussed herein may be used to affect different charges associated with an RF transaction region. For example, a fee corresponding to the RF transaction region 640 may change based on time of day, day of week, whether a day is a holiday, traffic congestion level, weight of vehicle, etc. For example, the weight sensors 628-30 may provide information on vehicle weight corresponding to the vehicles 631-637. The weight of a vehicle corresponding to the UE 500 may be associated with a transaction message from the UE 500 and a fee calculated based on the weight (and possibly one or more other factors). The fee may be sent to the UE 500, e.g., as part of the ACK message 772. A user of the UE 500 may use the fee information to determine whether to proceed with the transaction, e.g., paying the fee to access a toll road associated with the RF transaction region 640. As another example, information about the UE 500 or an entity associated with the UE 500 may be provided, e.g., in the STMs 742, 744 or the ETMs 752, 754. Information about a driver associated with the UE 500, such as a safety record (possibly as a function of factors such as time of day, weather conditions, etc.), driving experience, specialized training, age (e.g., senior citizen status), veteran status, disability status, student status, etc. may be factored in to determining a fee and/or a determination of whether access to a road is granted with or without a screening process. Also or alternatively, information associated with the UE 500 may be taken into account to determine a fee and/or whether access is granted with or without screening. For example, for a commercial vehicle UE, a fleet safety record (e.g., of a company associated with the UE 500), a vehicle weight, insurance carried by the company, any discounts or prepayments by the company, etc., may be used to determine a toll for the UE 500, whether the UE 500 is required to stop at a weigh station, etc. Information regarding the driver, the UE 500, a company associated with the UE 500, and/or other relevant information may be provided by the UE 500 (e.g., in one or more transaction messages, one or more other messages from the UE 500) or from another source (e.g., provided by a company to the server 400 via the network 135, 140). Such information may be provided with the UE 500 being in communication range of the RSE 620 or outside of this range, and may be provided before the UE 500 enters an RF transaction region or after the UE 500 leaves the RF transaction region (e.g., for a retroactive adjustment to a fee). Such information may be indicated directly or indirectly, e.g., by being associated with the UE 500 and determined by accessing information associated with the UE 500.

Information regarding a prospective transaction may be presented before a transaction is completed. For example, the RSE 620 may provide fee schedule information, present fee information, traffic conditions, etc., and a user of the UE 500 may obtain this information and decide whether to proceed with a transaction (e.g., paying a fee to access a toll road). For example, the RSE 620 may send the UE 500 an estimated fee, based on any relevant factors affecting the fee (e.g., time of day, weight of vehicle, etc.), for using a road associated with the RF transaction region 640, and a user of the UE 500 may decide whether to find an alternate route or use the associated road. The estimated fee may include an indication of a reduction in a RUC (e.g., how much RUC is included in the toll, if the RUC is in addition to the fee, etc.). Information provided to the UE 500 may be provided in the parameter message 722, 723, in the ACK message 772, or in another message. The information may be provided by the RSE 620 or from another source (e.g., provided by a back-end device such as the server 400 via the network 135, 140).

Operation

Figure 8:
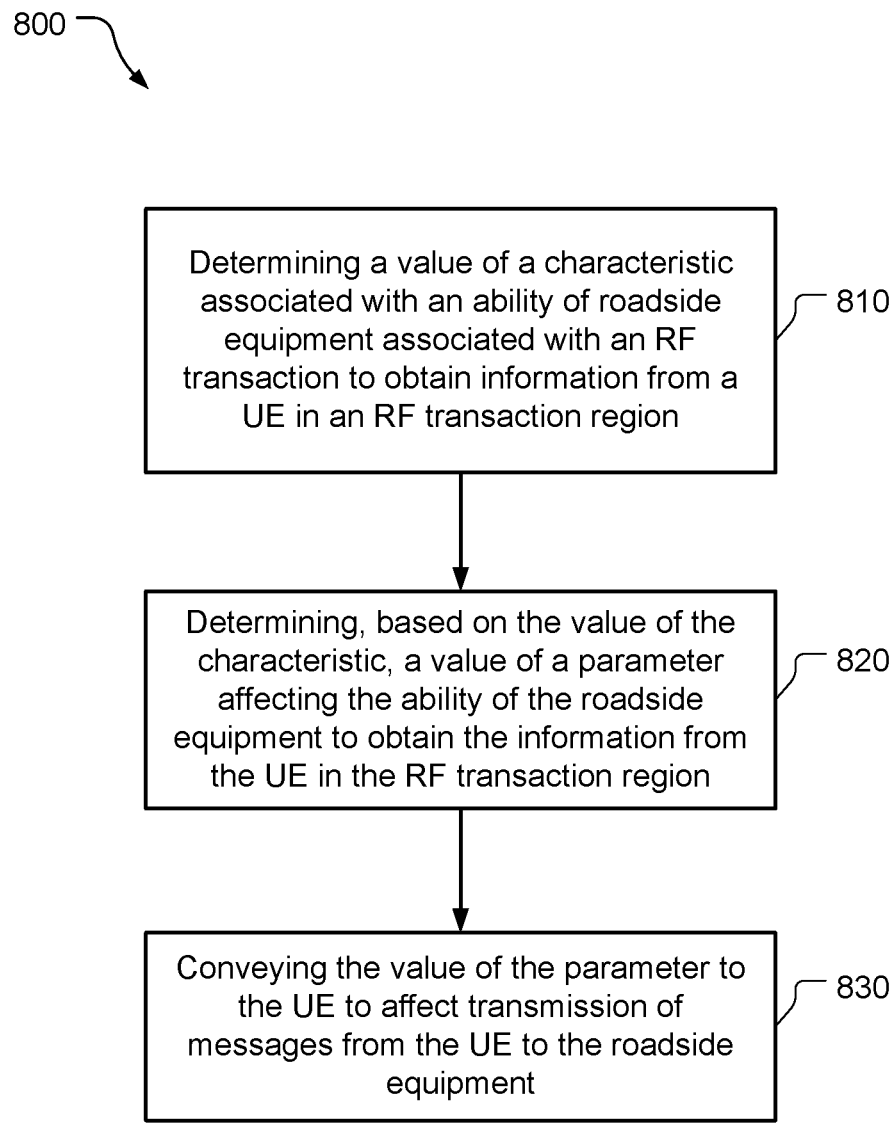
FIG. 8 is a block flow diagram of a method of controlling an RF transaction region.

Referring to FIG. 8, with further reference to FIGS. 1-7, a method 800 of controlling an RF transaction region includes the stages shown. The method 800 is, however, an example only and not limiting. The method 800 may be altered, e.g., by having stages added, removed, rearranged, combined, performed concurrently, and/or having single stages split into multiple stages. For example, one or more stages may occur before, and/or one or more stages may occur after, the stages shown in FIG. 8. For example, one or more measurements may be taken and values thereof provided for use in determining information affecting messaging in the RF transaction region.

At stage 810, the method 800 includes determining a value of a characteristic associated with an ability of roadside equipment associated with an RF transaction to obtain information from a UE in the RF transaction region. For example, the processor 310 may use information from the sensor message(s) 712 and/or information from one or more other sources (e.g., the server 400) to determine the value of the characteristic. Thus, for example, the processor 361 (e.g., the transaction unit 365), possibly in conjunction with the memory 363 (e.g., the software 359), may comprise means for determining the value of the characteristic. The characteristic may be, for example, a measured RF environment of the RF transaction region 640, a measured loss rate of the RF transaction region 640, a congestion schedule of the RF transaction region 640, a predicted loss rate of the RF transaction region 640, and/or a predicted RF environment of the RF transaction region 640, and/or one or more other characteristics. For example, the value of the characteristic could include a speed such as a speed of the UE 500, and/or the speed(s) of one or more other UEs, an average speed of UEs in the RF transaction region 640, a predicted average speed of UEs in the RF transaction region 640, and/or one or more other values. The measured RF environment may be a present RF environment determined from one or more measurements taken by the sensor(s) 380 and/or the transceiver 315 and/or taken by one or more other devices (e.g., one or more other RSEs, one or more other sensors, one or more UEs, etc.). The predicted RF environment may be an estimated RF environment (e.g., one or more predicted RF measurement values in the RF transaction region 640) based on historical data (e.g., measurements) for similar conditions as present, e.g., times of day, days of week, etc., and other information such as predicted conditions (e.g., weather). The measured loss rate may be a present loss rate determined from one or more measurements taken by the sensor(s) 380 and/or taken by one or more other devices (e.g., one or more other RSEs, one or more other sensors, etc.). The predicted loss rate may be an estimated loss rate based on historical data (e.g., measurements) for similar conditions as present, e.g., times of day, days of week, etc., and other information such as predicted conditions (e.g., weather, traffic congestion).

At stage 820, the method 800 includes determining, based on the value of the characteristic, a value of a parameter affecting the ability of the roadside equipment to obtain the information from the UE in the RF transaction region. For example, the processor 361 may use the RF environment, the loss rate, the speed(s), and/or one or more other characteristic values to determine one or more parameters affecting the ability to obtain information from the UE 500 in the RF transaction region, e.g., sent by the UE 500 while in the RF transaction region 640. The processor 361 (possibly in conjunction with the memory 363 (e.g., the software 359)) may comprise means for determining the value of the parameter.

At stage 830, the method 800 includes conveying the value of the parameter to the UE to affect transmission of messages from the UE to the roadside equipment. For example, the processor 361 may send the parameter message(s) 722-724 to the UE 500. The processor 361 may send one or more of the messages 722 via the interface 362 (e.g., the transmitter 352 of the transceiver 315), e.g., to a server of a web page. As another example, the processor 410 of the server 400 may send one or more of the messages 722 via the transmitter 452 of the transceiver 415, e.g., to a web page that the UE 500 may access. The processor 361 may send one or more of the messages 724, e.g., wirelessly via the interface 362 (e.g., the transmitter 342 of the transceiver 315) to the UE 500. Thus, for example, the processor 361 (possibly in conjunction with the memory 363 (e.g., the software 359)) and the interface 362 (e.g., the transmitter 342 of the transceiver 315) may comprise means for conveying the value of the parameter to the UE. Also or alternatively, as another example, the processor 410 (possibly in conjunction with the memory 411 (e.g., the software 412)) and the transmitter 442 and/or the transmitter 452 of the transceiver 415 may comprise means for conveying the value of the parameter to the UE. Determining and conveying the value of the parameter may control messaging traffic in the RF transaction region 640 and help improve a success rate of transaction message transfer, e.g., without negatively, or significantly negatively, affecting other messaging such as success rate of transfer of position messages.

Implementations of the method 800 may include one or more of the following features. In an example implementation, the parameter may comprise a perimeter of the RF transaction region, a minimum number of transaction messages to be sent by the UE while in the RF transaction region, a maximum number of the transaction messages to be sent by the UE while in the RF transaction region, a rate of the transaction messages to be sent by the UE while in the RF transaction region, a transmission power to be used by the UE to transmit the transaction messages while in the RF transaction region, or a combination of two or more of these (e.g., a perimeter and a rate of the transaction messages). For example, the parameter may comprise the rate of the transaction messages to be sent by the UE while in the RF transaction region, and the rate of the transaction messages to be sent by the UE while in the RF transaction region may be a function of speed of the UE while in the RF transaction region. In another example implementation, the parameter may comprise the rate of the transaction messages to be sent by the UE while in the RF transaction region, and the rate of the transaction messages to be sent by the UE while in the RF transaction region may be a portion of position messages in which the UE is to include the transaction messages. For example, the rate may be a ratio of the transaction messages to the position messages, e.g., such that one of every five position messages are to include transaction message information. In another example implementation, conveying the value of the parameter to the UE may comprise conveying the value of the parameter to the UE from the roadside equipment or from a back-end device, e.g., the server 400.

Figure 9:
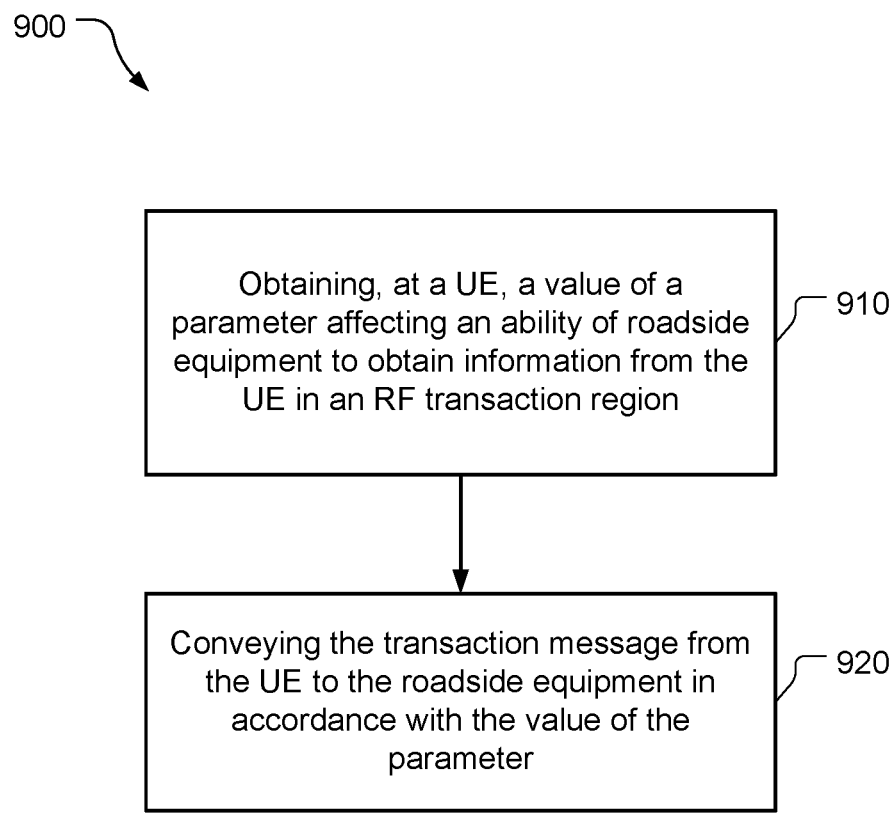
FIG. 9 is a block flow diagram of a method of conveying a transaction message associated with an RF transaction region.

Referring to FIG. 9, with further reference to FIGS. 1-8, a method 900 of conveying one or more transaction messages associated with a radio-frequency (RF) transaction region includes the stages shown. The method 900 is, however, an example only and not limiting. The method 900 may be altered, e.g., by having stages added, removed, rearranged, combined, performed concurrently, and/or having single stages split into multiple stages. For example, one or more stages may occur before, and/or one or more stages may occur after, the stages shown in FIG. 9. For example, one or more measurements may be taken and one or more values thereof provided for use in determining information affecting transaction messaging in the RF transaction region. As another example, one or more transaction messages may be determined in advance of the method 900.

At stage 910, the method 900 includes obtaining, at a user equipment (UE), a value of a parameter affecting an ability of roadside equipment to obtain information from the UE in the RF transaction region. For example, the processor 510 (e.g., the transaction unit 550) may receive, via the interface (e.g., the wireless receiver 244 and the antenna 246 of the transceiver 215), the parameter value in one or more of the parameter messages 722, 724 from the RSE 620, and/or from the server 400, and/or from another source, e.g., a web page. Thus, for example, the processor 510 (possibly in conjunction with the memory 530 (e.g., the software 532)) and the interface 520 (e.g., the wireless receiver 244 and the antenna 246 of the transceiver 215) may comprise means for obtaining the value of the parameter.

At stage 920, the method 900 includes conveying the one or more transaction messages from the UE to the roadside equipment in accordance with the value of the parameter. For example, the processor 510 (e.g., the transaction unit 550) may send one or more of the transaction messages 742, 744, 752, 754 via the interface 520 (e.g., the transmitter 242 of the transceiver 215) to the RSE 620 using any of a variety of technologies. Thus, for example, the processor 510 (possibly in conjunction with the memory 530 (e.g., the software 532)) and the interface 520 (e.g., the transmitter 242 of the transceiver 215) may comprise means for conveying the one or more transaction messages. The transaction message(s) 742, 744, 752, 754 may be sent directly to the RSE 620 or through one or more intermediary devices, such as one or more other UEs. By conveying the transaction message(s) from the UE to the RSE in accordance with the value of the parameter, a success rate of transfer of the transaction message to the RSE may be increased, e.g., without negatively, or significantly negatively, affecting other messaging such as success rate of transfer of position messages.

Implementations of the method 900 may include one or more of the following features. In an example implementation, the UE may obtain the value of the parameter before entering the RF transaction region. For example, the UE 500 may download the value of the parameter from a web page or other source in advance of entering the RF transaction region 640, or receive the value of the parameter from the RSE 620 (and/or other entity, e.g., a TRP 300) while in communication range of the RSE 620 but before entering the RF transaction region 640. In another example implementation, conveying the one or more transaction messages may comprise: conveying the one or more transaction messages from the UE only while the UE is within a perimeter of the RF transaction region indicated by the value of the parameter; or conveying at least a minimum number of the one or more transaction messages, indicated by the value of the parameter, while the UE is in the RF transaction region; or conveying no more than a maximum number of the one or more transaction messages, indicated by the value of the parameter, while the UE is in the RF transaction region; or conveying the one or more transaction messages at a rate, indicated by the value of the parameter, while the UE is in the RF transaction region; or conveying the one or more transaction messages at a transmission power, indicated by the value of the parameter, while the UE is in the RF transaction region; or a combination of two or more of any of these. For example, the UE 500 may convey between a minimum number and a maximum number of transactions messages while in the RF transaction region 640 and may do so at a specified rate (e.g., another transaction message every N ms). The rate may be a function of speed of the UE while in the RF transaction region, and/or may be a portion (e.g., percentage) of position messages sent by the UE 500. In another example implementation, the method 900 may include: receiving, at the UE, identifying information from another UE; and producing at least one of the one or more transaction messages as a composite transaction message including identifying information of the UE and the identifying information from the other UE. For example, one or more of the transaction message(s) 742, 744, 752, 754 may be a composite transaction message as discussed above. The processor 510 (possibly in conjunction with the memory 530 (e.g., the software 532)) and the interface 520 (e.g., the receiver 244 and the antenna 246) may comprise means for receiving the identifying information from the other UE. The processor 510 (possibly in conjunction with the memory 530 (e.g., the software 532)) may comprise means for producing at least one of the one or more transaction messages as a composite transaction message.

Figure 10:
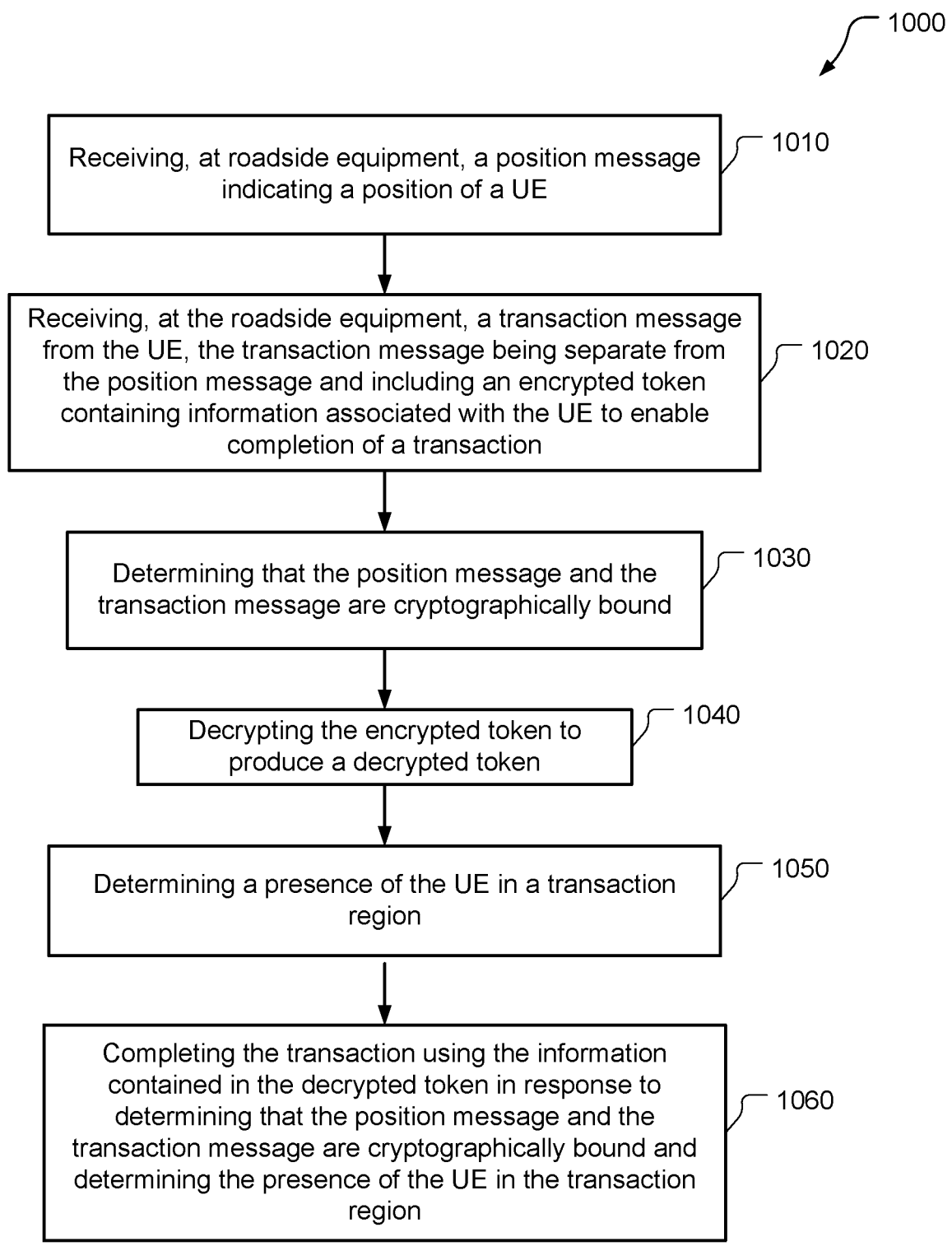
FIG. 10 is a block flow diagram of a method of completing a transaction for a UE.

Referring to FIG. 10, with further reference to FIGS. 1-8, a method 1000 of completing a transaction for a UE includes the stages shown. The method 1000 is, however, an example only and not limiting. The method 1000 may be altered, e.g., by having stages added, removed, rearranged, combined, performed concurrently, and/or having single stages split into multiple stages. For example, one or more stages may occur before, and/or one or more stages may occur after, the stages shown in FIG. 10.

At stage 1010, the method 1000 includes receiving, at roadside equipment, a position message indicating a position of the UE. For example, the processor 361 may receive, via the interface 362 (e.g., the receiver 344 and the antenna 346 of the transceiver 315), one or more of the position messages 732, 734. Thus, for example, the processor 361 (possibly in conjunction with the memory 363 (e.g., the software 359)) and the interface 362 (e.g., the receiver 344 and the antenna 346) may comprise means for receiving the position message.

At stage 1020, the method 1000 includes receiving, at the roadside equipment, a transaction message from the UE, the transaction message being separate from the position message and including an encrypted token containing information associated with the UE to enable completion of a transaction. For example, the processor 361 may receive, via the interface 362 (e.g., the receiver 344 and the antenna 346 of the transceiver 315), one or more of the transaction messages 742, 744, 752, 754. Thus, for example, the processor 361 (possibly in conjunction with the memory 363 (e.g., the software 359)) and the interface 362 (e.g., the receiver 344 and the antenna 346) may comprise means for receiving the transaction message. The encrypted token may comprise a composite token corresponding to multiple UEs.

At stage 1030, the method 1000 includes determining that the position message and the transaction message are cryptographically bound. For example, the processor 361 and/or the processor 410 may determine that the position message 732, 734 and a transaction message 742, 744, 752, 754 are digitally signed by the same digital certificate, or are cryptographically bound in another way. Thus, for example, the processor 361 (possibly in conjunction with the memory 363 (e.g., the software 359)) and/or the processor 410 (possibly in conjunction with the memory 411 (e.g., the software 412)) may comprise means for conveying the value of the parameter to the UE. This determination may help positively associate a device, e.g., the UE 500 (e.g., a vehicle) with a transaction message. The determination may help determine that the UE 500 is (or was) in the RF transaction region 640 and/or may help provide a mechanism to verify presence of the UE 500 in the RF transaction region 640. The determination may be made after decrypting the token (e.g., if the transaction message is a standalone message) or before decrypting the token (e.g., if the transaction message is part of another position message such as part of an embedded transaction message).

At stage 1040, the method 1000 includes decrypting the encrypted token to produce a decrypted token. For example, the processor 361 and/or the processor 410 may decrypt the encrypted token, e.g., after determining that the position message and the transaction message are cryptographically bound (e.g., if the encrypted token is in an embedded transaction message), or before determining that the position message and transaction message are cryptographically bound (e.g., if the encrypted token is in a standalone transaction message). Thus, for example, the processor 361 (possibly in conjunction with the memory 363 (e.g., the software 359)) and/or the processor 410 (possibly in conjunction with the memory 411 (e.g., the software 412)) may comprise means for decrypting the encrypted token. The encrypted token may be decrypted using a private key associated with the RSE 620 or the server 400 (or another device).

At stage 1050, the method 1000 includes determining a presence of the UE in a transaction region. For example, the processor 361 and/or the processor 410 may use information about the position of the UE 500 provided in the position message along with the determination that the position message and the transaction message are cryptographically bound to determine that the UE 500 is (or was) in the RF transaction region 640. Thus, for example, the processor 361 (possibly in conjunction with the memory 363 (e.g., the software 359)) and/or the processor 410 (possibly in conjunction with the memory 411 (e.g., the software 412)) may comprise means for determining presence of the UE in the transaction region. The determination of the presence of the UE in the transaction region may be based on the UE 500 being instructed to send transaction messages only when in an RF transaction region such as the RF transaction region 640.

At stage 1060, the method 1000 includes completing the transaction using the information contained in the decrypted token in response to determining that the position message and the transaction message are cryptographically bound and determining the presence of the UE in the transaction region. For example, the processor 361 and/or the processor 410 may complete a transaction, e.g., complete all actions required by the processor 361 and/or the processor 410 to cause a desired result, e.g., collection of a fee from an account associated with the UE 500. Thus, for example, the processor 361 (possibly in conjunction with the memory 363 (e.g., the software 359)) and/or the interface 362, and/or the processor 410 (possibly in conjunction with the memory 411 (e.g., the software 412)) and/or the transceiver 415, may comprise means for completing the transaction.

Figure 11:
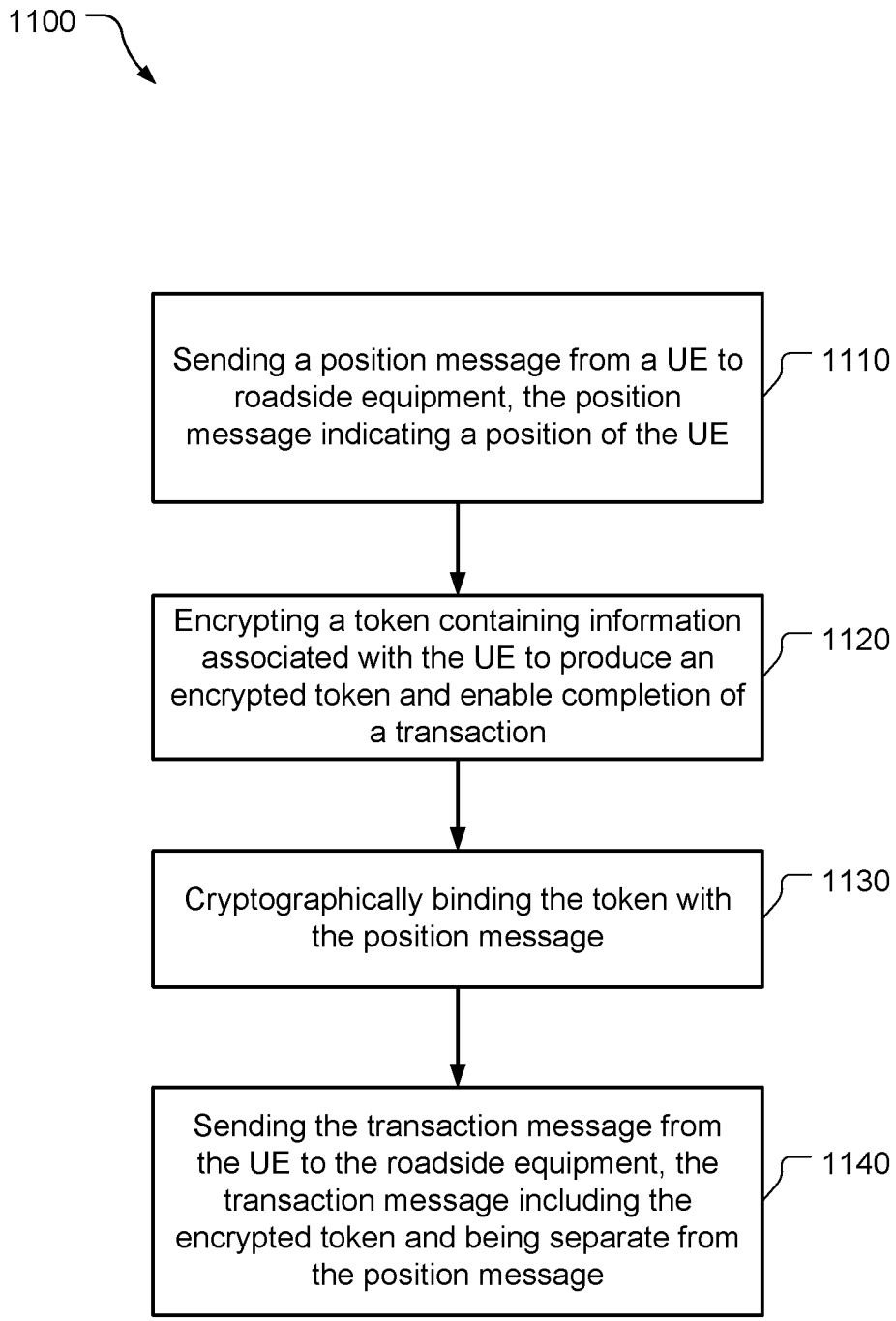
FIG. 11 is a block flow diagram of a method of providing a transaction message.

Referring to FIG. 11, with further reference to FIGS. 1-8, a method 1100 of providing a transaction message includes the stages shown. The method 1100 is, however, an example only and not limiting. The method 1100 may be altered, e.g., by having stages added, removed, rearranged, combined, performed concurrently, and/or having single stages split into multiple stages. For example, one or more stages may occur before, and/or one or more stages may occur after, the stages shown in FIG. 11.

At stage 1110, the method 1100 includes sending a position message from a UE to roadside equipment, the position message indicating a position of the UE. For example, the processor 510 may send the position message(s) 732, 734 to the RSE 620 via the interface 520 (e.g., transmitter 242 and the antenna 246 of the transceiver 215), with the position message(s) 732, 734 indicating a location of the UE 500 (e.g., at or just before a time when the position message 732, 734 is sent) and possibly a velocity vector and/or acceleration vector of the UE 500. Thus, for example, the processor 510 (possibly in conjunction with the memory 530 (e.g., the software 532)) and the interface 520 (e.g., the transmitter 242 and the antenna 246) may comprise means for sending the position message to the RSE.

At stage 1120, the method 1100 includes encrypting a token containing information associated with the UE to produce an encrypted token and enable completion of a transaction. For example, the processor 510 may encrypt the token using a public key of the RSE 620 (or a public key of the server 400). Thus, for example, the processor 510 (possibly in conjunction with the memory 530 (e.g., the software 532)) may comprise means for encrypting the token. The token may be encrypted before cryptographically binding the token to a position message (e.g., if the token is part of an ETM) or after cryptographic binding (e.g., if the token in in an STM). The token may be a composite token as discussed above.

At stage 1130, the method 1100 includes cryptographically binding the token with the position message. For example, the processor 510 may digitally sign the token with the same digital certificate used to digitally sign the position message, or bind the token and the position message in another cryptographic way. Thus, for example, the processor 510 (possibly in conjunction with the memory 530 (e.g., the software 532)) may comprise means for cryptographically binding the position message with the token. This binding may help positively associate a device, e.g., the UE 500 (e.g., a vehicle) with a transaction message. The binding may help with a determination that the UE 500 is (or was) in the RF transaction region and/or may help provide a mechanism to verify presence of the UE 500 in the RF transaction region 640. The binding may be performed after encryption of the token (e.g., if the token is in an ETM) or before the encryption (e.g., if the token is in an STM).

At stage 1140, the method 1100 includes sending the transaction message from the UE to the roadside equipment, the transaction message including the encrypted token and being separate from the position message. For example, the processor 510 may send the transaction message(s) 742, 744, 752, 754 to the RSE 620 via the interface 520 (e.g., the transmitter 242 and the antenna 246 of the transceiver 215), with the transaction message(s) 742, 744, 752, 754 including the encrypted token. Thus, for example, the processor 510 (possibly in conjunction with the memory 530 (e.g., the software 532)) and the interface 520 (e.g., the transmitter 242 and the antenna 246) may comprise means for sending the transaction message to the RSE.

Figure 12:
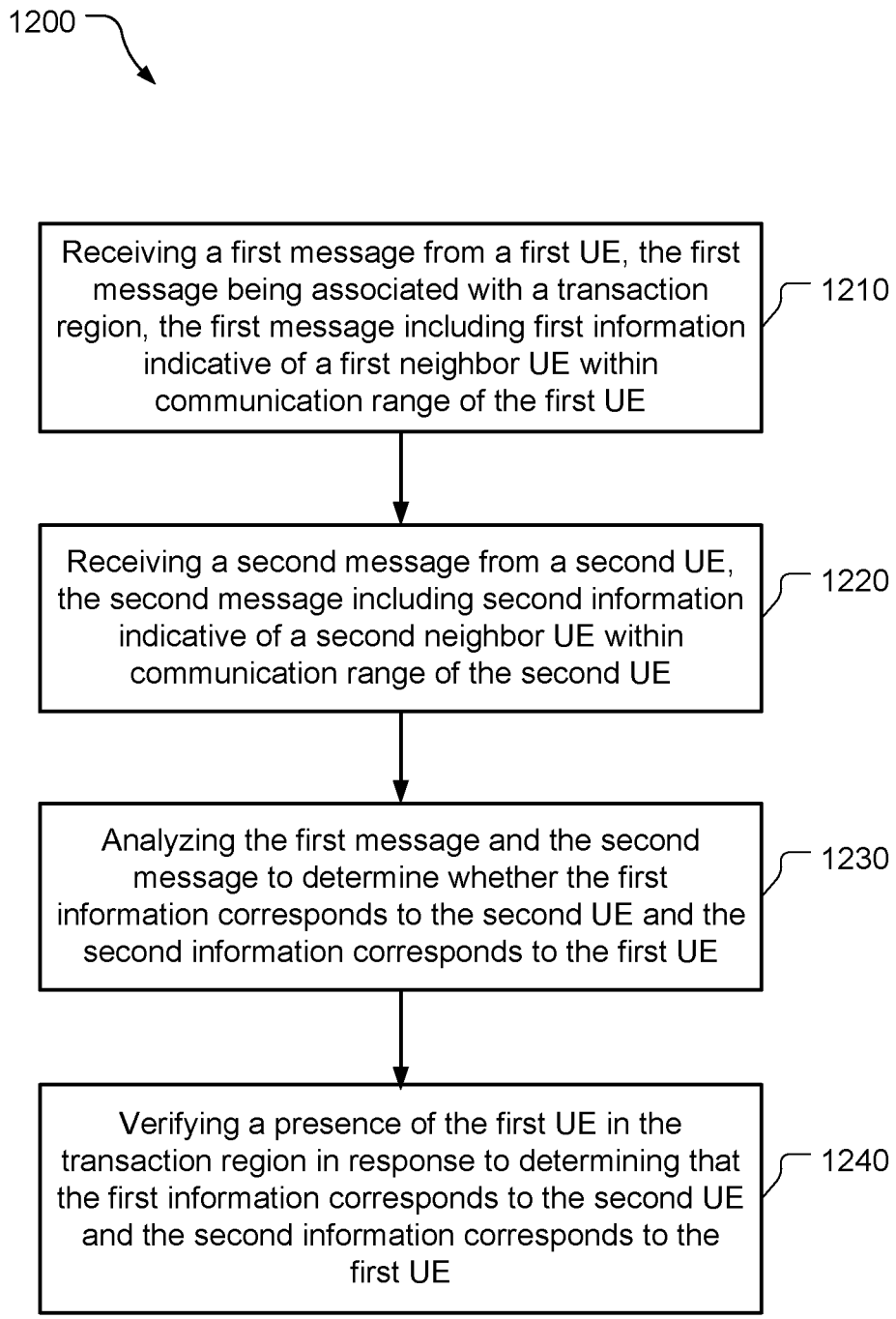
FIG. 12 is a block flow diagram of a method of verifying presence of a UE in a transaction region.

Referring to FIG. 12, with further reference to FIGS. 1-8, a method 1200 of verifying presence of a first user equipment (UE) in a transaction region includes the stages shown. The method 1200 is, however, an example only and not limiting. The method 1200 may be altered, e.g., by having stages added, removed, rearranged, combined, performed concurrently, and/or having single stages split into multiple stages. For example, one or more stages may occur before, and/or one or more stages may occur after, the stages shown in FIG. 12. The method 1200 provides techniques for crowdsourcing information to verify presence of a UE, e.g., to help confirm presence of the UE at a place that the UE is asserted to have been at a particular time and/or to help reject a denial of presence of the UE at a place that the UE is asserted not to have been at a particular time.

At stage 1210, the method 1200 includes receiving a first message from the first UE, the first message being associated with the transaction region, the first message including first information indicative of a first neighbor UE within communication range of the first UE. For example, the processor 361 and/or the processor 410 and/or another processor (of another device) may receive (via the interface 362, e.g., the receiver 344, 354 of the transceiver 315, and/or the receiver 444, 454 of the transceiver 415, respectively) a transaction message 742, 744, 752, 754 with a neighbor list. Thus, for example, the processor 361 (possibly in conjunction with the memory 363 (e.g., the software 359)) and the interface 362 (e.g., the receiver 344 and the antenna 346, and/or the receiver 354) and/or the processor 410 (possibly in conjunction with the memory 411 (e.g., the software 412)) and the receiver 444, 454 of the transceiver 415 may comprise means for receiving the first message from the first UE. The message may be received via one or more intermediary devices such as one or more other UEs.

At stage 1220, the method 1200 includes receiving a second message from a second UE, the second message including second information indicative of a second neighbor UE within communication range of the second UE. For example, a second message may be received by the processor 361 and/or the processor 410 (and/or another processor) from the other UE 705, with the second message including a neighbor list. Thus, for example, the processor 361 (possibly in conjunction with the memory 363 (e.g., the software 359)) and the interface 362 (e.g., the receiver 344 and the antenna 346 and/or the receiver 354 of the transceiver 315) and/or the processor 410 (possibly in conjunction with the memory 411 (e.g., the software 412)) and the receiver 444, 454 of the transceiver 415 may comprise means for receiving the second message from the second UE.

At stage 1230, the method 1200 includes analyzing the first message and the second message to determine whether the first information corresponds to the second UE and the second information corresponds to the first UE. For example, the processor 361 and/or the processor 410 (and/or another processor) may compare neighbor lists to determine whether each neighbor list includes the other UE (e.g., the neighbor list from the UE 500 includes the UE 705, and the neighbor list from the UE 705 includes the UE 500). Thus, for example, the processor 361 (possibly in conjunction with the memory 363 (e.g., the software 359)) and/or the processor 410 (possibly in conjunction with the memory 411 (e.g., the software 412)) may comprise means for analyzing the first message and the second message.

At stage 1240, the method 1200 includes verifying a presence of the first UE in the transaction region in response to determining that the first information corresponds to the second UE and the second information corresponds to the first UE. For example, the processor 361 and/or the processor 410 (and/or another processor) may determine that the UE 500 is (or was) present in the RF transaction region 640 if the neighbor lists of the UEs 500, 705 include each other. The verifying may include determining that at least one of the positions of the UEs 500, 705 at the time of interest is or was in the RF transaction region 640, e.g., based on position indicated in one or more position messages, and/or based on one or more other techniques (e.g., trilateration, presence of the UE 500 in a neighbor list of a static device of known location, etc.). Thus, for example, the processor 361 (possibly in conjunction with the memory 363 (e.g., the software 359)) and/or the processor 410 (possibly in conjunction with the memory 411 (e.g., the software 412)) may comprise means for verifying presence of the UE in the transaction region. This verification may help to confirm an assertion of presence, and/or refute a denial of presence, of the UE 500 in the RF transaction region 640 at a particular time.

Implementations of the method 1200 may include one or more of the following features. In an example implementation, the method 1200 may include sending a collection message to the first UE indicating what information to report as the first information. For example, the processor 361 and/or the processor 410 and/or another processor (of another device) may send (via the interface 362, e.g., the transmitter 342, 352 of the transceiver 315, and/or the transmitter 442, 452 of the transceiver 415, respectively) instructions, e.g., in a parameter message or another message, requesting the UE 500 and the UE 705 to collect and report information (e.g., neighbor lists including information about the neighbors). Thus, for example, the processor 361 (possibly in conjunction with the memory 363 (e.g., the software 359)) and the interface 362 (e.g., the transmitter 342 and the antenna 346 and/or the receiver 352) and/or the processor 410 (possibly in conjunction with the memory 411 (e.g., the software 412)) and the transmitter 442 and the antenna 446 and/or the transmitter 452 of the transceiver 415 may comprise means for sending the collection message. The collection message may indicate to collect and report information that is ephemeral and non-repeating.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the RSE 620 (e.g., for transaction messaging customization and/or cryptographic binding of a transaction requestor and position reports) may be performed outside of the RSE 620 such as by the server 400 and/or another RSE. For example, another RSE or back-end system may determine the RF environment of the RF transaction region 640, and/or the loss rate of the RF transaction region 640, and/or a congestion schedule of the RF transaction region 640, etc. As another example, the server 400 may receive and decrypt transaction messages encrypted with a public encryption key of the server 400 and complete transactions as appropriate (or deny transaction completion as appropriate, e.g., if position message and transaction message are not signed by the same digital certificate). As another example, a back-end device such as the server 400 may determine and provide ACK messages. As another example, messaging parameters may be determined and/or provided (e.g., using cellular, WiFi, and/or one or more other technologies) by a back-end device such as the server 400.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method of controlling a radio-frequency (RF) transaction region, the method comprising:
   determining a value of a characteristic associated with an ability of roadside equipment, associated with an RF transaction, to obtain information from a user equipment (UE) in the RF transaction region, the characteristic comprising a predicted loss rate of the RF transaction region, based on a loss rate of the RF transaction region corresponding to at least one first day prior to a present day, the loss rate being a first quantity of UEs determined, from measurements, to enter the RF transaction region during a time interval that fail to trigger a transaction relative to a second quantity of a total number of UEs determined to enter the RF transaction region during the time interval, and the predicted loss rate being a predicted rate at which UEs entering the RF transaction region fail to trigger a transaction;
   determining, based on the value of the characteristic, a value of a parameter affecting the ability of the roadside equipment to obtain the information from the UE in the RF transaction region; and
   conveying the value of the parameter to the UE to affect transmission of messages from the UE to the roadside equipment.

2. The method of claim 1, wherein the characteristic is comprises at least one of a measured RF environment of the RF transaction region, a measured transaction loss rate of the RF transaction region, a congestion schedule of the RF transaction region, or a predicted RF environment of the RF transaction region, based on an RF environment of the transaction region corresponding to at least one second day prior to the present day.

3. The method of claim 1, wherein the parameter comprises:
   (a) a perimeter of the RF transaction region; or
   (b) a minimum number of transaction messages to be sent by the UE while in the RF transaction region; or
   (c) a maximum number of the transaction messages to be sent by the UE while in the RF transaction region; or
   (d) a rate of the transaction messages to be sent by the UE while in the RF transaction region; or
   (e) a transmission power to be used by the UE to transmit the transaction messages while in the RF transaction region; or
   (f) a combination of two or more of (a)-(e).

4. The method of claim 3, wherein the parameter comprises the rate of the transaction messages to be sent by the UE while in the RF transaction region, and wherein the rate of the transaction messages to be sent by the UE while in the RF transaction region is a function of speed of the UE while in the RF transaction region.

5. The method of claim 3, wherein the parameter comprises the rate of the transaction messages to be sent by the UE while in the RF transaction region, and wherein the rate of the transaction messages to be sent by the UE while in the RF transaction region is a portion of position messages in which the UE is to include the transaction messages.

6. The method of claim 1, wherein conveying the value of the parameter to the UE comprises conveying the value of the parameter to the UE from the roadside equipment or from a back-end device.

7. An apparatus configured to affect a radio-frequency (RF) transaction region, the apparatus comprising:
   a transmitter; and
   a processor communicatively coupled to the transmitter and configured to:
      determine a value of a characteristic associated with an ability of roadside equipment associated with an RF transaction to obtain information from a user equipment (UE) in the RF transaction region, the characteristic comprising a predicted loss rate of the RF transaction region, based on a loss rate of the RF transaction region corresponding to at least one first day prior to a present day, the loss rate being a first quantity of UEs determined, from measurements, to enter the RF transaction region during a time interval that fail to trigger a transaction relative to a second quantity of a total number of UEs determined to enter the RF transaction region during the time interval, and the predicted loss rate being a predicted rate at which UEs entering the RF transaction region fail to trigger a transaction;
      determine, based on the value of the characteristic, a value of a parameter affecting the ability of the roadside equipment to obtain the information from the UE in the RF transaction region; and send the value of the parameter to the UE to affect transmission of messages from the UE to the roadside equipment.

8. The apparatus of claim 7, wherein the characteristic is comprises at least one of a measured RF environment of the RF transaction region, a measured transaction loss rate of the RF transaction region, or a congestion schedule of the RF transaction region, or a predicted RF environment of the RF transaction region, based on an RF environment of the transaction region corresponding to at least one second day prior to the present day.

9. The apparatus of claim 7, wherein the parameter comprises:
 (a) a perimeter of the RF transaction region; or
 (b) a minimum number of transaction messages to be sent by the UE while in the RF transaction region; or
 (c) a maximum number of the transaction messages to be sent by the UE while in the RF transaction region; or
 (d) a rate of the transaction messages to be sent by the UE while in the RF transaction region; or
 (e) a transmission power to be used by the UE to transmit the transaction messages while in the RF transaction region; or
 (f) a combination of two or more of (a)-(e).

10. The apparatus of claim 9, wherein the parameter comprises the rate of the transaction messages to be sent by the UE while in the RF transaction region, and wherein the rate of the transaction messages to be sent by the UE while in the RF transaction region is a function of speed of the UE while in the RF transaction region.

11. The apparatus of claim 9, wherein the parameter comprises the rate of the transaction messages to be sent by the UE while in the RF transaction region, wherein the rate of the transaction messages to be sent by the UE while in the RF transaction region is a portion of position messages in which the UE is to include the transaction messages.

12. The apparatus of claim 7, wherein the processor is configured to cause the transmitter to send the value of the parameter to the UE wirelessly.

13. An apparatus configured to affect a radio-frequency (RF) transaction region, the apparatus comprising:
 means for determining a value of a characteristic associated with an ability of roadside equipment associated with an RF transaction to obtain information from a user equipment (UE) in the RF transaction region, the characteristic comprising a predicted loss rate of the RF transaction region, based on a loss rate of the RF transaction region corresponding to at least one first day prior to a present day, the loss rate being a first quantity of UEs determined, from measurements, to enter the RF transaction region during a time interval that fail to trigger a transaction relative to a second quantity of a total number of UEs determined to enter the RF transaction region during the time interval, and the predicted loss rate being a predicted rate at which UEs entering the RF transaction region fail to trigger a transaction;
 means for determining, based on the value of the characteristic, a value of a parameter affecting the ability of the roadside equipment to obtain the information from the UE in the RF transaction region; and
 means for conveying the value of the parameter to the UE to affect transmission of messages from the UE to the roadside equipment.

14. The apparatus of claim 13, wherein the characteristic is comprises at least one of a measured RF environment of the RF transaction region, a measured transaction loss rate of the RF transaction region, or a congestion schedule of the RF transaction region, or a predicted RF environment of the RF transaction region, based on an RF environment of the transaction region corresponding to at least one second day prior to the present day.

15. The apparatus of claim 13, wherein the parameter comprises:
 (a) a perimeter of the RF transaction region; or
 (b) a minimum number of transaction messages to be sent by the UE while in the RF transaction region; or
 (c) a maximum number of the transaction messages to be sent by the UE while in the RF transaction region; or
 (d) a rate of the transaction messages to be sent by the UE while in the RF transaction region; or
 (e) a transmission power to be used by the UE to transmit the transaction messages while in the RF transaction region; or
 (f) a combination of two or more of (a)-(e).

16. The apparatus of claim 15, wherein the parameter comprises the rate of the transaction messages to be sent by the UE while in the RF transaction region, and wherein the rate of the transaction messages to be sent by the UE while in the RF transaction region is a function of speed of the UE while in the RF transaction region.

17. The apparatus of claim 15, wherein the parameter comprises the rate of the transaction messages to be sent by the UE while in the RF transaction region, and wherein the rate of the transaction messages to be sent by the UE while in the RF transaction region is a portion of position messages in which the UE is to include the transaction messages.

18. The apparatus of claim 13, wherein the means for conveying are for conveying the value of the parameter to the UE comprises conveying the value of the parameter to the UE wirelessly.

19. A non-transitory, processor-readable storage medium comprising processor-readable instructions configured to cause a processor to:
 determine a value of a characteristic associated with an ability of roadside equipment associated with a radio-frequency (RF) transaction to obtain information from a user equipment (UE) in an RF transaction region, the characteristic comprising a predicted loss rate of the RF transaction region, based on a loss rate of the RF transaction region corresponding to at least one first day prior to a present day, the loss rate being a first quantity of UEs determined, from measurements, to enter the RF transaction region during a time interval that fail to trigger a transaction relative to a second quantity of a total number of UEs determined to enter the RF transaction region during the time interval, and the predicted loss rate being a predicted rate at which UEs entering the RF transaction region fail to trigger a transaction;
 determine, based on the value of the characteristic, a value of a parameter affecting the ability of the roadside equipment to obtain the information from the UE in the RF transaction region; and
 send the value of the parameter to the UE to affect transmission of messages from the UE to the roadside equipment.

20. The storage medium of claim 19, wherein the characteristic comprises at least one of a measured RF environment of the RF transaction region, a measured transaction loss rate of the RF transaction region, or a congestion schedule of the RF transaction region, or a predicted RF environment of the RF transaction region, based on an RF environment of the transaction region corresponding to at least one second day prior to the present day.

21. The storage medium of claim 19, wherein the parameter comprises:
- (a) a perimeter of the RF transaction region; or
- (b) a minimum number of transaction messages to be sent by the UE while in the RF transaction region; or
- (c) a maximum number of the transaction messages to be sent by the UE while in the RF transaction region; or
- (d) a rate of the transaction messages to be sent by the UE while in the RF transaction region; or
- (e) a transmission power to be used by the UE to transmit the transaction messages while in the RF transaction region; or
- (f) a combination of two or more of (a)-(e).

22. The storage medium of claim 21, wherein the parameter comprises the rate of the transaction messages to be sent by the UE while in the RF transaction region, and wherein the rate of the transaction messages to be sent by the UE while in the RF transaction region is a function of speed of the UE while in the RF transaction region.

23. The storage medium of claim 21, wherein the parameter comprises the rate of the transaction messages to be sent by the UE while in the RF transaction region, and wherein the rate of the transaction messages to be sent by the UE while in the RF transaction region is a portion of position messages in which the UE is to include the transaction messages.

24. The storage medium of claim 19, wherein the processor is configured to cause a transceiver of the roadside equipment to send the value of the parameter to the UE wirelessly.

25. A method of conveying one or more transaction messages associated with a radio-frequency (RF) transaction region, the method comprising:
- obtaining, at a user equipment (UE), a value of a parameter affecting an ability of roadside equipment to obtain information from the UE in the RF transaction region, the value of the parameter comprising a predicted loss rate of the RF transaction region, based on a loss rate of the RF transaction region corresponding to at least one previous day prior to a present day, the loss rate being a first quantity of UEs determined, from measurements, to enter the RF transaction region during a time interval that fail to trigger a transaction relative to a second quantity of a total number of UEs determined to enter the RF transaction region during the time interval, and the predicted loss rate being a predicted rate at which UEs entering the RF transaction region fail to trigger a transaction; and
- conveying the one or more transaction messages from the UE to the roadside equipment in accordance with the value of the parameter.

26. The method of claim 25, wherein the UE obtains the value of the parameter before entering the RF transaction region.

27. The method of claim 25, wherein conveying the one or more transaction messages comprises:
- (a) conveying the one or more transaction messages from the UE only while the UE is within a perimeter of the RF transaction region indicated by the value of the parameter; or
- (b) conveying at least a minimum number of the one or more transaction messages, indicated by the value of the parameter, while the UE is in the RF transaction region; or
- (c) conveying no more than a maximum number of the one or more transaction messages, indicated by the value of the parameter, while the UE is in the RF transaction region; or
- (d) conveying the one or more transaction messages at a rate, indicated by the value of the parameter, while the UE is in the RF transaction region; or
- (e) conveying the one or more transaction messages at a transmission power, indicated by the value of the parameter, while the UE is in the RF transaction region; or
- (f) a combination of two or more of (a)-(e).

28. The method of claim 27, wherein conveying the one or more transaction messages comprises conveying the one or more transaction messages at the rate indicated by the value of the parameter, wherein the rate is a function of speed of the UE while in the RF transaction region.

29. The method of claim 27, wherein conveying the one or more transaction messages comprises conveying the one or more transaction messages at the rate indicated by the value of the parameter, wherein the rate is a portion of position messages sent by the UE in which the UE is to include the transaction messages.

30. The method of claim 25, further comprising:
- receiving, at the UE, identifying information from another UE; and
- producing at least one of the one or more transaction messages as a composite transaction message including identifying information of the UE and the identifying information from the other UE.

31. A user equipment (UE) for conveying one or more transaction messages associated with a radio-frequency (RF) transaction region, the UE comprising:
- a transmitter; and
- a processor communicatively coupled to the transmitter and configured to:
  - obtain a value of a parameter affecting an ability of roadside equipment to obtain information from the UE in the RF transaction region, the value of the parameter comprising a predicted loss rate of the RF transaction region, based on a loss rate of the RF transaction region corresponding to at least one previous day prior to a present day, the loss rate being a first quantity of UEs determined, from measurements, to enter the RF transaction region during a time interval that fail to trigger a transaction relative to a second quantity of a total number of UEs determined to enter the RF transaction region during the time interval, and the predicted loss rate being a predicted rate at which UEs entering the RF transaction region fail to trigger a transaction; and
  - convey the one or more transaction messages via the transmitter to the roadside equipment in accordance with the value of the parameter.

32. The UE of claim 31, wherein the processor is configured to obtain the value of the parameter before entering the RF transaction region.

33. The UE of claim 31, wherein to convey the one or more transaction messages the processor is configured to determine whether the UE is in the RF transaction region and to:
- (a) convey the one or more transaction messages only while the UE is within a perimeter of the RF transaction region indicated by the value of the parameter; or (b) convey at least a minimum number of the one or more transaction messages, indicated by the value of the parameter, while the UE is in the RF transaction region; or
(c) convey no more than a maximum number of the one or more transaction messages, indicated by the value of the parameter, while the UE is in the RF transaction region; or
(d) convey the one or more transaction messages at a rate, indicated by the value of the parameter, while the UE is in the RF transaction region; or
(e) convey the one or more transaction messages at a transmission power, indicated by the value of the parameter, while the UE is in the RF transaction region; or
(f) a combination of two or more of (a)-(e).

34. The UE of claim 33, wherein the processor is configured to determine a speed of the UE and to convey the one or more transaction messages as a function of the speed of the UE in accordance with the rate indicated by the value of the parameter.

35. The UE of claim 33, wherein to convey the one or more transaction messages the processor is configured to convey the one or more transaction messages in fewer than all position messages to be sent by the UE in accordance with the rate indicated by the value of the parameter.

36. The UE of claim 31, further comprising a receiver communicatively coupled to the processor, wherein the processor is configured to:
receive, via the receiver, identifying information from another UE; and
produce at least one of the one or more transaction messages as a composite transaction message including identifying information of the UE and the identifying information from the other UE.

37. A user equipment (UE) for conveying one or more transaction messages associated with a radio-frequency (RF) transaction region, the UE comprising:
means for obtaining a value of a parameter affecting an ability of roadside equipment to obtain information from the UE in the RF transaction region, the value of the parameter comprising a predicted loss rate of the RF transaction region, based on a loss rate of the RF transaction region corresponding to at least one previous day prior to a present day, the loss rate being a first quantity of UEs determined, from measurements, to enter the RF transaction region during a time interval that fail to trigger a transaction relative to a second quantity of a total number of UEs determined to enter the RF transaction region during the time interval, and the predicted loss rate being a predicted rate at which UEs entering the RF transaction region fail to trigger a transaction; and
means for conveying the one or more transaction messages from the UE to the roadside equipment in accordance with the value of the parameter.

38. The UE of claim 37, wherein the means for obtaining are for obtaining the value of the parameter before the UE enters the RF transaction region.

39. The UE of claim 37, further comprising means for determining whether the UE is in the RF transaction region, wherein the means for conveying the one or more transaction messages comprise means for:
(a) conveying the one or more transaction messages from the UE only while the UE is within a perimeter of the RF transaction region indicated by the value of the parameter; or
(b) conveying at least a minimum number of the one or more transaction messages, indicated by the value of the parameter, while the UE is in the RF transaction region; or
(c) conveying no more than a maximum number of the one or more transaction messages, indicated by the value of the parameter, while the UE is in the RF transaction region; or
(d) conveying the one or more transaction messages at a rate, indicated by the value of the parameter, while the UE is in the RF transaction region; or
(e) conveying the one or more transaction messages at a transmission power, indicated by the value of the parameter, while the UE is in the RF transaction region; or
(f) a combination of two or more of (a)-(e).

40. The UE of claim 39, further comprising means for determining a speed of the UE, wherein the means for conveying the one or more transaction messages are for conveying the one or more transaction messages as a function of the speed of the UE in accordance with the rate indicated by the value of the parameter.

41. The UE of claim 39, wherein the means for conveying the one or more transaction messages are for conveying the one or more transaction messages in fewer than all position messages to be sent by the UE in accordance with the rate indicated by the value of the parameter.

42. The UE of claim 37, further comprising:
means for receiving identifying information from another UE; and
means for producing at least one of the one or more transaction messages as a composite transaction message including identifying information of the UE and the identifying information from the other UE.

43. A non-transitory, processor-readable storage medium comprising processor-readable instructions configured to cause a processor of a user equipment (UE), in order to convey one or more transaction messages, to:
obtain a value of a parameter affecting an ability of roadside equipment to obtain information from the UE in a radio-frequency (RF) transaction region, the value of the parameter comprising a predicted loss rate of the RF transaction region, based on a loss rate of the RF transaction region corresponding to at least one previous day prior to a present day, the loss rate being a first quantity of UEs determined, from measurements, to enter the RF transaction region during a time interval that fail to trigger a transaction relative to a second quantity of a total number of UEs determined to enter the RF transaction region during the time interval, and the predicted loss rate being a predicted rate at which UEs entering the RF transaction region fail to trigger a transaction; and
convey the one or more transaction messages via a transmitter of the UE to the roadside equipment in accordance with the value of the parameter.

44. The storage medium of claim 43, wherein the instructions configured to cause the processor to obtain the value of the parameter are configured to cause the processor to obtain the value of the parameter before the UE enters the RF transaction region.

45. The storage medium of claim 43, further comprising instructions configured to cause the processor to determine whether the UE is in the RF transaction region, wherein the instructions configured to cause the processor to convey the one or more transaction messages are configured to cause the processor to:

(a) convey the one or more transaction messages only while the UE is within a perimeter of the RF transaction region indicated by the value of the parameter; or
(b) convey at least a minimum number of the one or more transaction messages, indicated by the value of the parameter, while the UE is in the RF transaction region; or
(c) convey no more than a maximum number of the one or more transaction messages, indicated by the value of the parameter, while the UE is in the RF transaction region; or
(d) convey the one or more transaction messages at a rate, indicated by the value of the parameter, while the UE is in the RF transaction region; or
(e) convey the one or more transaction messages at a transmission power, indicated by the value of the parameter, while the UE is in the RF transaction region; or
(f) a combination of two or more of (a)-(e).

46. The storage medium of claim 45, further comprising instructions configured to cause the processor to determine a speed of the UE, wherein the instructions configured to cause the processor to convey the one or more transaction messages are configured to cause the processor to convey the one or more transaction messages as a function of the speed of the UE in accordance with the rate indicated by the value of the parameter.

47. The storage medium of claim 45, wherein the instructions configured to cause the processor to convey the one or more transaction messages are configured to cause the processor to convey the one or more transaction messages in fewer than all position messages to be sent by the UE in accordance with the rate indicated by the value of the parameter.

48. The storage medium of claim 43, further comprising instructions configured to cause the processor to:
receive identifying information from another UE; and
produce at least one of the one or more transaction messages as a composite transaction message including identifying information of the UE and the identifying information from the other UE.

* * * * *